United States Patent
Oizumi et al.

(10) Patent No.: US 9,882,670 B2
(45) Date of Patent: Jan. 30, 2018

(54) TERMINAL COMMUNICATION APPARATUS, BASE STATION COMMUNICATION APPARATUS, COMMUNICATION RECEPTION METHOD AND COMMUNICATION TRANSMISSION METHOD

(71) Applicant: Panasonic Intellectual Property Corporation of America, Torrance, CA (US)

(72) Inventors: Toru Oizumi, Kanagawa (JP); Akihiko Nishio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 27 days.

(21) Appl. No.: 14/433,576

(22) PCT Filed: Sep. 25, 2013

(86) PCT No.: PCT/JP2013/005664
§ 371 (c)(1),
(2) Date: Apr. 3, 2015

(87) PCT Pub. No.: WO2014/068839
PCT Pub. Date: May 8, 2014

(65) Prior Publication Data
US 2015/0270916 A1    Sep. 24, 2015

(30) Foreign Application Priority Data

Oct. 30, 2012  (JP) .................................. 2012-238995

(51) Int. Cl.
*H04J 11/00*    (2006.01)
*H04J 3/16*    (2006.01)
(Continued)

(52) U.S. Cl.
CPC .......... *H04J 11/003* (2013.01); *H04J 3/1694* (2013.01); *H04L 5/0055* (2013.01);
(Continued)

(58) Field of Classification Search
None
See application file for complete search history.

(56) References Cited

U.S. PATENT DOCUMENTS 8,001,249 B2    8/2011  Murphy et al.
8,325,661 B2 *  12/2012 Montojo ............. H04W 72/042
                                        370/329
(Continued)

FOREIGN PATENT DOCUMENTS

EP    2 159 939 A1    3/2010
EP    2 445 249 A1    4/2012
(Continued)

OTHER PUBLICATIONS

Extended European Search Report dated Sep. 18, 2015, for corresponding EP Application No. 13852204.0-1857 / 2916583, 6 pages.
(Continued)

*Primary Examiner* — Hicham Foud
(74) *Attorney, Agent, or Firm* — Seed IP Law Group LLP

(57) ABSTRACT

Provided is a terminal that is capable of avoiding a PHICH resource conflict where terminals having different UL-DL configurations coexist. When a response signal transmitted in a first sub-frame is in response to uplink data transmitted in a second sub-frame of a first configuration pattern, and a response signal transmitted in the first sub-frame is in response to uplink data transmitted in a third sub-frame of a second configuration pattern that is set on another terminal for which the configuration pattern setting cannot be changed, a first resource to be allocated to the response signal in the first sub-frame that is transmitted in response to
(Continued)

the uplink data transmitted in the second sub-frame from the terminal; is different from a second resource to be allocated to the response signal in the third sub-frame that is transmitted in response to the uplink data transmitted from the another terminal.

4 Claims, 13 Drawing Sheets

(51) Int. Cl.

| | | |
|---|---|---|
| *H04W 72/04* | (2009.01) | |
| *H04W 72/08* | (2009.01) | |
| *H04L 5/14* | (2006.01) | |
| *H04L 5/00* | (2006.01) | |
| *H04L 1/18* | (2006.01) | |

(52) U.S. Cl.
 CPC ............. *H04L 5/0073* (2013.01); *H04L 5/14* (2013.01); *H04L 5/1469* (2013.01); *H04W 72/042* (2013.01); *H04W 72/0446* (2013.01); *H04W 72/082* (2013.01); *H04L 1/1861* (2013.01)

(56) References Cited

U.S. PATENT DOCUMENTS

| | | | |
|---|---|---|---|
| 2009/0135748 A1* | 5/2009 | Lindoff | ............... H04W 72/048 370/296 |
| 2010/0054161 A1 | 3/2010 | Montojo et al. | |
| 2010/0058347 A1 | 3/2010 | Smith et al. | |
| 2010/0260136 A1 | 10/2010 | Fan et al. | |
| 2011/0116465 A1 | 5/2011 | Miki et al. | |
| 2012/0120855 A1* | 5/2012 | Torsner | ................. H04L 1/1854 370/280 |
| 2012/0230245 A1* | 9/2012 | Ostergaard | ........ H04W 72/0426 370/315 |
| 2012/0327821 A1* | 12/2012 | Lin | ..................... H04W 72/048 370/280 |
| 2013/0094462 A1 | 4/2013 | Montojo et al. | |
| 2013/0242815 A1* | 9/2013 | Wang | .................... H04L 1/1854 370/280 |
| 2013/0329703 A1* | 12/2013 | Lee | ...................... H04L 1/1893 370/336 |
| 2013/0329704 A1* | 12/2013 | Lee | ...................... H04L 1/1893 370/336 |
| 2014/0010128 A1* | 1/2014 | He | ......................... H04W 4/06 370/280 |
| 2014/0023004 A1* | 1/2014 | Kumar | ................ H04W 72/082 370/329 |
| 2014/0161001 A1 | 6/2014 | Gao et al. | |
| 2015/0110082 A1* | 4/2015 | Sun | ....................... H04L 1/1854 370/336 |

FOREIGN PATENT DOCUMENTS

| | | |
|---|---|---|
| JP | 2009-272827 A | 11/2009 |
| JP | 2012-501603 A | 1/2012 |
| WO | 2007/091831 A2 | 8/2007 |
| WO | 2012/106840 A1 | 8/2012 |

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.

3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.

Alcatel-Lucent Shanghai Bell, Alcatel-Lucent, "Discussion on timing issues with dynamic TDD UL-DL configuration," R1-122510, 3GPP TSG RAN WG1 Meeting #69, Agenda Item: 7.10.5, Prague, Czech Republic, May 21-25, 2012, 8 pages.

International Search Report dated Dec. 24, 2013, for corresponding International Application No. PCT/JP2013/005664, 4 pages.

NTT DoCoMo, Mitsubishi Electric, NEC, Sharp, "Semi-static Configuration of Non-adaptive and Adaptive HARQ in E-UTRA Downlink," R1-074811 (Original R1-073698), 3GPP TSG RAN WG1 Meeting #51, Agenda Item: 6.2.3, Jeju, Korea, Nov. 5-9, 2007, 2 pages.

Pantech, "PUSCH HARQ/scheduling timing in inter-band CA with different TDD UL-DL configuration," R1-122443, 3GPP TSG RAN 1 #69, Agenda Item: 7.2.1.5, Prague, Czech Republic, May 21-25, 2012, 5 pages.

Communication pursuant to Article 94(3) EPC, dated Jul. 3, 2017, for corresponding European Application No. 13 852 204.0-1857, 8 pages.

\* cited by examiner

Factor of $m_i$

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | - | - | - | 2 | 1 | - | - | - |
| 1 | 0 | 1 | - | - | 1 | 0 | 1 | - | - | 1 |
| 2 | 0 | 0 | - | 1 | - | 0 | 0 | - | 1 | 0 |
| 3 | 1 | 0 | - | - | - | 0 | 0 | 0 | 1 | 1 |
| 4 | 0 | 0 | - | - | - | 0 | 0 | 0 | 1 | 1 |
| 5 | 0 | 0 | - | 0 | - | 0 | 0 | 0 | 1 | 0 |
| 6 | 1 | 1 | - | - | - | 1 | 1 | - | - | 1 |

FIG. 3A
(PRIOR ART)

PUSCH-PHICH timing

| TDD UL/DL Configuration | subframe number n | | | | | | | | | | $I_{PHICH}$ |
|---|---|---|---|---|---|---|---|---|---|---|---|
| | 0 | 1 | 2 | 3 | 4 | 5 | 6 | 7 | 8 | 9 | |
| 0 | 7 | 4 | | | | 7 | 4 | | | | 0 |
| 1 | 6 | | | | 6 | | | | | | 1 |
| 2 | | | | 6 | | | | | | | 0 |
| 3 | | | | | 6 | | | | | | 0 |
| 4 | | | | | 6 | 6 | | | | | 0 |
| 5 | | | | | | | | 6 | 6 | 6 | 0 |
| 6 | 6 | 4 | | | | 7 | 4 | | | 6 | 0 |

FIG. 3B
(PRIOR ART)

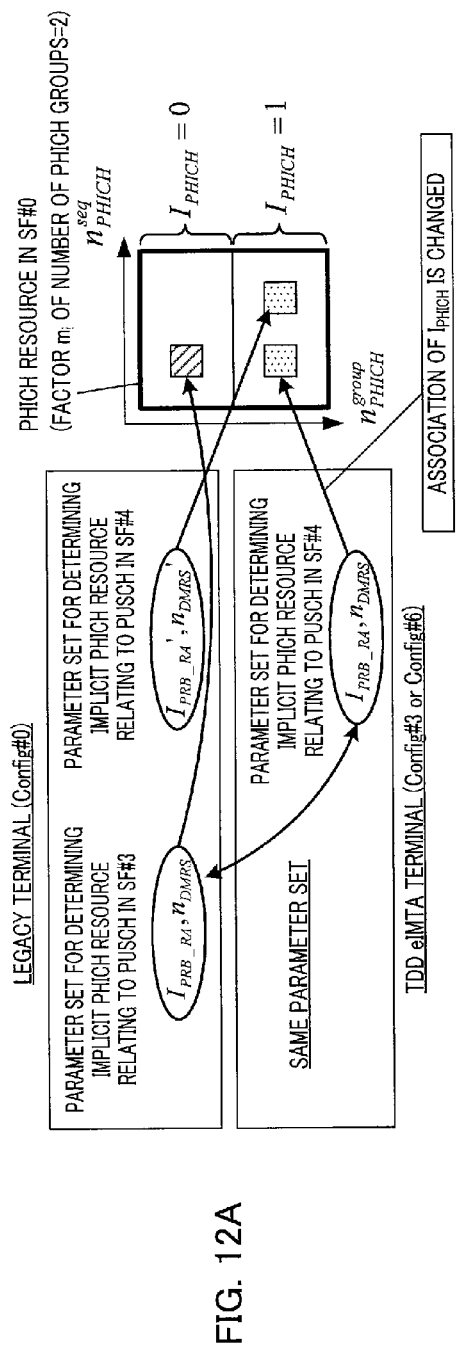

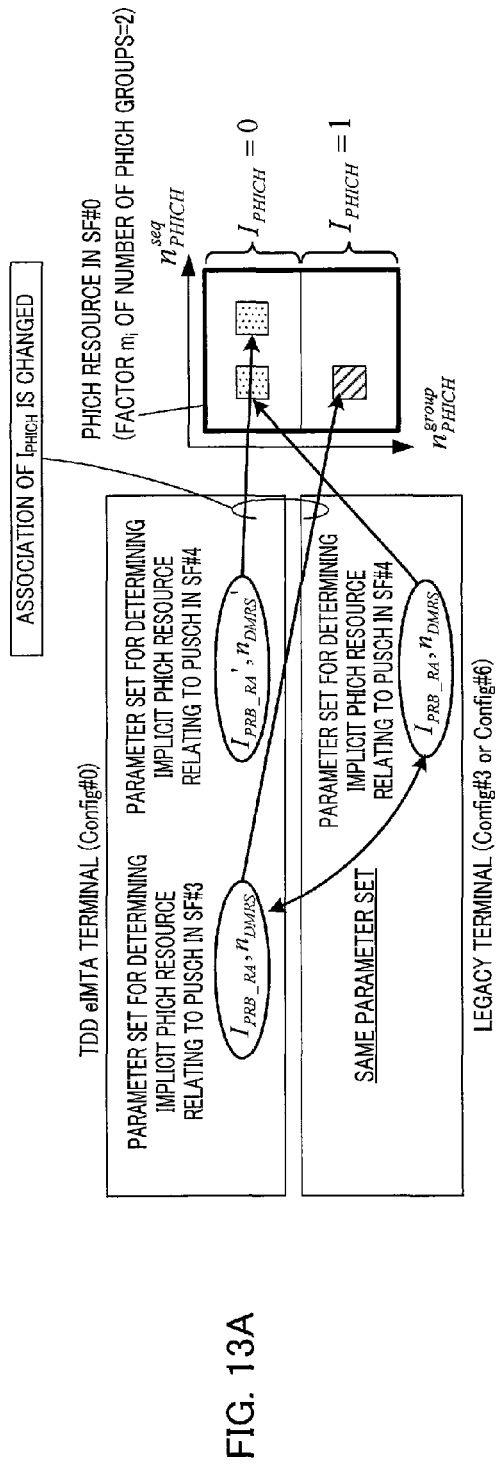

TERMINAL COMMUNICATION APPARATUS, BASE STATION COMMUNICATION APPARATUS, COMMUNICATION RECEPTION METHOD AND COMMUNICATION TRANSMISSION METHOD

TECHNICAL FIELD

The present invention relates to a terminal apparatus, a base station apparatus, a reception method and a transmission method.

BACKGROUND ART

3GPP LTE adopts OFDMA (Orthogonal Frequency Division Multiple Access) as a downlink communication scheme. In a radio communication system to which 3GPP LTE is applied, a base station (which may also be called "eNB") transmits a synchronization signal (Synchronization Channel: SCH) and broadcast signal (Broadcast Channel: BCH) using predetermined communication resources. A terminal (which may also be called "UE") captures SCH and thereby secures synchronization with the base station. The terminal then reads BCH information and thereby acquires a parameter specific to the base station (e.g., frequency bandwidth) (see NPLs 1, 2 and 3).

After completion of the acquisition of the parameter specific to the base station, the terminal sends a connection request to the base station and thereby establishes communication with the base station. The base station transmits control information to the terminal with which communication has been established via a downlink control channel such as PDCCH (Physical Downlink Control Channel) as appropriate.

The terminal then performs "blind detection" of a plurality of pieces of control information (which may also be called "downlink control information (DCI)") included in the received PDCCH signal. That is, the control information includes a CRC (Cyclic Redundancy Check) portion and this CRC portion is masked with a terminal ID of the transmission target terminal by the base station. Therefore, the terminal cannot determine whether or not the received control information is control information intended for the terminal until the terminal demasks the CRC portion with the terminal ID of the terminal itself. When the demasking result shows that CRC calculation is OK, it is determined in this blind detection that the control information is intended for the terminal itself. The downlink control information includes DL (downlink) assignment indicating assignment information of downlink data and UL (uplink) grant indicating assignment information of uplink data, for example.

Next, an uplink retransmission control method in 3GPP LTE will be described. In LTE, UL grant which is assignment information of uplink data is transmitted to the terminal by PDCCH. Here, in an FDD (Frequency Division Duplex) system, a UL grant indicates resource assignment within a target subframe which is the fourth subframe from the subframe in which the UL grant is transmitted.

Meanwhile, in a TDD (Time Division Duplex) system, a UL grant indicates resource assignment within a target subframe which is the fourth or after the fourth subframe from the subframe in which the UL grant is transmitted. This will be described more specifically using FIG. 1. In the TDD system, a downlink component carrier (which may also be called "downlink CC (Component Carrier)") and an uplink component carrier (which may also be called "uplink CC") are in the same frequency band, and the TDD system realizes downlink communication and uplink communication by switching between downlink and uplink in a time-division manner. For this reason, in the TDD system, a downlink component carrier can also be expressed as "downlink communication timing in a component carrier." An uplink component carrier can also be expressed as "uplink communication timing in a component carrier." Switching between the downlink component carrier and the uplink component carrier is performed based on a UL-DL configuration as shown in FIG. 1. The UL-DL configuration is indicated to the terminal by a broadcast signal called "SIB1 (System Information Block Type 1)" (SIB1 indication), the value thereof is the same throughout the entire system and the value is not expected to be changed frequently. In the UL-DL configuration shown in FIG. 1, timings in units of subframes (that is, units of 1 msec) are configured for downlink communication (DL: Downlink) and uplink communication (UL: Uplink) per frame (10 msec). The UL-DL configuration allows for building a communication system that can flexibly respond to demand for more throughput for either downlink communication or uplink communication by changing a subframe ratio between downlink communication and uplink communication. For example, FIG. 1 illustrates UL-DL configurations (Config#0 to 6) with different subframe ratios between downlink communication and uplink communication. In FIG. 1, a downlink communication subframe is represented by "D," an uplink communication subframe is represented by "U" and a special subframe is represented by "S." Here, the special subframe is a subframe when a downlink communication subframe is switched to an uplink communication subframe. In the special subframe, downlink data communication may also be performed as in the case of a downlink communication subframe. As shown by a solid line arrow in FIG. 1 (UL grant-PUSCH timing), a subframe to which uplink data for UL grant (PUSCH: Physical Uplink Shared Channel) is assigned is an uplink communication subframe which is the fourth or after the fourth subframe from the subframe in which the UL grant is indicated, and is uniquely defined as shown in FIG. 1.

Uplink retransmission control (UL retransmission control) supports non-adaptive retransmission in which retransmission data is assigned to the same frequency resource as the one to which uplink data is assigned at the time of the last transmission and adaptive retransmission in which retransmission data can be assigned to a frequency resource different from the one to which uplink data was assigned at the last transmission (e.g., see NPL 4). In non-adaptive retransmission, only PHICH (Physical Hybrid ARQ Indicator CHannel) for transmitting an ACK/NACK signal (response signal), in response to uplink data, to the terminal is used as a channel for a retransmission control signal. When requesting the terminal to perform retransmission, the base station transmits a NACK to the terminal using PHICH and transmits an ACK using PHICH when not requesting the terminal to perform retransmission. In non-adaptive retransmission, since the base station can designate retransmission using only PHICH, non-adaptive retransmission has an advantage that the overhead of a control signal transmitted over downlink necessary to designate retransmission is small.

Here, in the FDD system, PHICH is indicated to the terminal using a resource within a target subframe which is the fourth subframe from the subframe in which uplink data is transmitted. Meanwhile, in the TDD system, PHICH is indicated to the terminal using a resource within a target subframe which is the fourth or after the fourth subframe from the subframe in which uplink data is transmitted. This will be described more specifically using FIG. 1. As shown by a broken line arrow (PUSCH-PHICH timing) in FIG. 1, a subframe to which ACK/NACK (PHICH) in response to uplink data (PUSCH) is assigned is a downlink communication subframe or special subframe 4 or more subframes after a subframe in which the uplink data is indicated and is uniquely defined as shown in FIG. 1.

In adaptive retransmission, the base station transmits an ACK using PHICH while designating retransmission and a retransmission resource using UL grant for indicating resource assignment information. UL grant includes a bit called "NDI (New Data Indicator)" and this bit is binary having 0 or 1. The terminal compares an NDI of the received UL grant this time with an NDI of the last UL grant in the same retransmission process (HARQ (Hybrid ARQ) process), determines that new data has been assigned when there is a change in the NDI or determines that retransmission data has been assigned when there is no change in the NDI. Since adaptive retransmission allows the amount of resources and MCS (Modulation and Coding Scheme) to be changed according to a required SINR (Signal-to-Interference and Noise power Ratio) of retransmission data, adaptive retransmission has an advantage that spectrum efficiency improves.

Since a CRC (Cyclic Redundancy Check) is added to UL grant, a received signal with UL grant has higher reliability than PHICH. For this reason, when the terminal receives PHICH and UL grant, the terminal follows an instruction of UL grant.

FIG. 2 shows an example of a procedure for UL retransmission control in the terminal. In FIG. 2, in step (hereinafter abbreviated as "ST") 11, the terminal determines whether or not there is UL grant. When there is UL grant (ST11: YES), the flow proceeds to ST12 and when there is no UL grant (ST11: NO), the flow proceeds to ST15.

In ST12, the terminal compares the NDI of UL grant this time with the NDI of the last UL grant in the same retransmission process and determines whether or not there is any change in the NDI. When there is a change in the NDI (ST12: YES), the flow proceeds to ST13 and when there is no change in the NDI (ST12: NO), the flow proceeds to ST14.

The terminal transmits new data to the base station in ST13 and transmits retransmission data to the base station through adaptive retransmission in ST14.

In ST15, the terminal determines whether or not PHICH is NACK. When PHICH is NACK (ST15: YES), the flow proceeds to ST16, and when PHICH is ACK (ST15: NO), the flow proceeds to ST17.

In ST16, the terminal transmits retransmission data to the base station through non-adaptive retransmission, and in ST17, suspending is applied, so that the terminal suspends retransmission control.

Next, a configuration of PHICH will be described.

It should be noted that in an LTE system and an LTE-A (LTE-Advanced) system which is an evolved version of LTE, one RB (Resource Block) is made up of 12 subcarriers×0.5 msec and a unit combining two RBs on the time domain is called "RB pair."

Therefore, the RB pair is made up of 12 subcarriers×1 msec. When the RB pair represents a block of 12 subcarriers on the frequency domain, the RB pair may be simply called "RB." In addition, a unit of 1 subcarrier×1 OFDM symbol is called "1 RE (Resource Element)." 1 REG (Resource Element Group) is made up of 4 REs.

First, in coding of PHICH, ACK/NACK (1 bit) is subjected to three-time repetition. The number of PHICHs is one of {16, 12, 1, 2} times the number of RBs and is indicated by PBCH (Physical Broadcast Channel). The base station can transmit 8 PHICHs in 3 REGs (=12 REs) through code multiplexing and IQ multiplexing with SF (spreading factor)=4. The 8 PHICHs arranged on 3 REGs are called a PHICH group and expressed as "number of PHICH groups (that is, the number of resources) $N^{group}_{PHICH}$ is 8." In the FDD system, the number of PHICH groups $N^{group}_{PHICH}$ takes the same value in all subframes.

Meanwhile, in the TDD system, as shown in FIG. 3A, a factor ($m_i$) of number of PHICH groups is defined in each UL-DL configuration and each downlink communication subframe or special subframe. The total number of PHICH groups (=factor in; of number of PHICH groups $N^{group}_{PHICH}$×the number of PHICH groups) is changed for each subframe using this factor. In the FDD system, the factor of number of PHICH groups is always 1 irrespective of subframes.

The reason that the total number of PHICHs varies from one subframe to another in the TDD system will be described using FIG. 3B. FIG. 3B illustrates the number of subframes before a PHICH received by the terminal in subframe #n is associated with a PUSCH transmitted by the terminal. Blanks in FIG. 3B indicate that there are no PHICHs. For example, as shown in FIG. 3B, PHICH in subframe #1 of Config#0 is associated with PUSCH transmitted in subframe #7 which is 4 subframes earlier (see FIG. 1). In subframe #1 of Config#0, since PUSCH in one subframe is associated with PHICH in one subframe, factor $m_i$ of the number of PHICH groups is assumed to be 1 as in the case of the FDD system (see FIG. 3A). On the other hand, as shown in FIG. 3B, PHICH in subframe #0 of Config#0 is associated with PUSCHs transmitted in subframe #3 which is 7 subframes earlier and in subframe #4 which is 6 subframes earlier respectively. That is, in subframe #0 of Config#0, the terminal receives PHICHs corresponding to two PUSCHs. Thus, in subframe #0 of Config#0, twice as many resources for PHICH (hereinafter referred to as "PHICH resources") as those in subframe #1 of Config#0 are required, and therefore factor $m_i$ of number of PHICH groups is considered to be 2 (see FIG. 3A).

In FIG. 3B, two PHICHs intended for the same terminal received in the same subframe (e.g., subframes #0 and 5) are distinguished by parameter $I_{PHICH}$. For example, in subframe #0 of Config#0, PHICH corresponding to PUSCH 7 subframes earlier corresponds to $I_{PHICH}=0$ and PHICH corresponding to PUSCH 6 subframes earlier corresponds to $I_{PHICH}=1$. The same applies to subframe #5 of Config#0. For PHICHs in other UL-DL configurations and subframes, $I_{PHICH}$ is always 0.

A PHICH resource is represented by a combination $\{n^{group}_{PHICH}, n^{seq}_{PHICH}\}$ of an index of the total number of PHICH resources $n^{group}_{PHICH}$ and an index of orthogonal sequence $n^{seq}_{PHICH}$. The index of the total number of PHICH resources $n^{group}_{PHICH}$ and the index of orthogonal sequence $n^{seq}_{PHICH}$ are expressed by following equations 1 and 2 respectively.

$$n^{group}_{PHICH} = (I_{PRB\_RA} + n_{DMRS}) \bmod N^{group}_{PHICH} + I_{PHICH} N^{group}_{PHICH} \quad \text{(Equation 1)}$$

$$n^{seq}_{PHICH} = (\lfloor I_{PRB\_RA}/N^{group}_{PHICH} \rfloor + n_{DMRS}) \bmod 2N^{PHICH}_{SF} \quad \text{(Equation 2)}$$

Here, $N^{PHICH}_{SF}$ is a spreading factor (SF) that varies depending on the length of a CP (Cyclic Prefix). $I_{PRB\_RA}$ is a minimum value of a PRB (Physical RB) index to which PUSCH corresponding to PHICH is assigned. In transport block #1, $I_{PRB\_RA}$ is a minimum value of a PRB (Physical RB) index to which PUSCH corresponding to PHICH is assigned. In transport block #2, $I_{PRB\_RA}$ is a value obtained by adding 1 to the minimum value of the PRB index to which PUSCH corresponding to PHICH is assigned. Meanwhile, $n_{DMRS}$ is a cyclic shift value of DMRS (Demodulation Reference Signal) included in UL grant that indicates PUSCH corresponding to PHICH. Since $I_{PRB\_RA}$ and $n_{DMRS}$ depend on assignment of UL grant and PUSCH, a PHICH resource can be said to be implicitly indicated (implicit signalling) based on the assignment of UL grant and PUSCH. The determined PHICH resource is divided for every value of $I_{PHICH}$. For example, in subframe #0 of Config#0, PHICH corresponding to PUSCH 7 subframes earlier and PHICH corresponding to PUSCH 6 subframes earlier are designed such that the PHICH resources do not conflict with each other.

The method of determining PHICH resources in subframe #0 of Config#0 will be described using FIG. 4. As shown in FIG. 4A, there are two PHICHs intended for the same terminal in subframe #0 of Config#0. One PHICH is PHICH corresponding to PUSCH in subframe #3 seven subframes earlier and $I_{PHICH}=0$ is defined. $I_{PRB\_RA}$ and $n_{DMRS}$ are uniquely defined by the assignment of PUSCH in subframe #3 and UL grant indicating the PUSCH. As shown in FIG. 4B, PHICH resources corresponding to PUSCH in subframe #3 are uniquely defined within a region of $n^{group}_{PHICH} < N^{group}_{PHICH}$ by the combination of $I_{PRB\_RA}$ and $n_{DMRS}$, and $I_{PHICH}=0$.

As shown in FIG. 4A, the other PHICH is PHICH corresponding to PUSCH in subframe #4 six subframes earlier and $I_{PHICH}=1$ is defined. $I_{PRB\_RA}$ and $n_{DMRS}$ are uniquely defined by the assignment of PUSCH in subframe #4 and UL grant indicating the PUSCH (hereinafter described as $I_{PRB\_RA}'$ and $n_{DMRS}'$ for distinction). As shown in FIG. 4B, PHICH resources corresponding to PUSCH in subframe #4 are uniquely defined within the region of $N^{group}_{PHICH} \leq n^{group}_{PHICH} < 2*N^{group}_{PHICH}$ by the combination of $I_{PRB\_RA}'$ and $n_{DMRS}'$ and $I_{PHICH}=1$. Here, coefficient 2 of $2*N^{group}_{PHICH}$ which is an upper limit value of $n^{group}_{PHICH}$ corresponds to $m_i=2$ in FIG. 3A.

Mapping of PHICH depends on a cell ID. Therefore, it is difficult to control interference of PHICH with other cells and PHICH may interfere with PDCCH and/or CRS (Cell-specific Reference Signal) in other cells. All of 3 REGs making up PHICH may be arranged on OFDM symbol #0 (not shown) or 3 REGs may be arranged one for each of OFDM symbols #0, #1 and #2 as shown in FIG. 4. Information indicating which PHICH arrangement is used is indicated to the terminal using a broadcast signal.

The number of OFDM symbols (1 to 3) occupied by PDCCH is determined based on the value of CFI (Control Format Indicator) indicated by PCFICH (Physical Control Format Indicator Channel) arranged on OFDM symbol #0. Moreover, when detecting PDCCH, the terminal performs blind detection on some resources in resource regions except resources occupied by PCFICH, PHICH and reference signals (hereinafter may also be referred to as "PDCCH resources") of resource regions corresponding to the number of OFDM symbols indicated by CFI from OFDM symbol #0.

In the LTE-A system, studies are being carried out on changing UL-DL configuration (hereinafter referred to as "TDD eIMTA (enhancement for DL-UL Interference Management and Traffic Adaptation)," which may also be referred to as "dynamic TDD" or "flexible TDD"). Exemplary purposes of TDD eIMTA include provision of a service that meets the needs of users by flexible changes of a ULDL ratio or reduction in power consumption at a base station by increasing the UL ratio in a time zone when traffic load is low. As a method of changing UL-DL configuration, the following methods are under study in accordance with the purpose of change: (1) method using indication of an SI (System Information) signaling base, (2) method using indication of an RRC (higher layer) signaling base, (3) method using indication of a MAC (Media Access Control layer) signaling base and (4) method using indication of an L1 (Physical Layer) signaling base.

Method (1) is to change the least frequent UL-DL configuration. Method (1) is suitable for a case where the purpose is to reduce power consumption at a base station by increasing the UL ratio, for example, in a time zone when traffic load is low (e.g., midnight or early morning). Method (4) is to change the most frequent UL-DL configuration change. The number of terminals connected is smaller in a small cell such as a pico cell than in a large cell such as a macro cell. In a pico cell, ULDL traffic in the entire pico cell is determined depending on the level of ULDL traffic in a small number of terminals connected to the pico cell. For this reason, ULDL traffic in the pico cell fluctuates drastically with time. Thus, method (4) is suitable for a case where UL-DL configuration is changed to follow a time fluctuation of ULDL traffic in a small cell such as a pico cell. Method (2) and method (3) are positioned between method (1) and method (4) and suitable for a case where UL-DL configuration is changed with medium frequency.

CITATION LIST

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011
NPL 4
R1-074811, "Semi-static Configuration of Non-adaptive and Adaptive HARQ in E-UTRA Downlink"

SUMMARY OF INVENTION

Technical Problem

A case will be considered where a terminal using an SIB1-indicated UL-DL configuration (hereinafter may be referred to as "non-TDD eIMTA terminal" or "legacy terminal") coexists with a terminal that supports TDD eIMTA using UL-DL configuration which is different from the SIB1-indicated UL-DL configuration (hereinafter may be referred to as "TDD eIMTA terminal").

As shown in FIG. 3B, the LTE system and LTE-A system define PUSCH timing corresponding to PHICH for each UL-DL configuration (timing relating to uplink retransmission control). Moreover, as shown in FIG. 3A, a factor ($m_i$) of the number of PHICH groups is defined in association with PHICH reception timing in a terminal. Therefore, the timing relating to uplink retransmission control and a factor of the number of PHICH groups may differ between a legacy terminal using SIB1-indicated UL-DL configuration and a TDD eIMTA terminal using UL-DL configuration which is different from the SIB1-indicated UL-DL configuration.

As an example, FIG. 6A illustrates a case where Config#0 is set in a legacy terminal and Config#6 is set in a TDD eIMTA terminal. That is, in FIG. 6A, in subframe #0, the legacy terminal receives PHICH corresponding to PUSCH in subframe #3 seven subframes earlier defined by $I_{PHICH}=0$ and further receives PHICH corresponding to PUSCH in subframe #4 six subframes earlier defined by $I_{PHICH}=1$. On the other hand, in subframe #0, the TDD eIMTA terminal receives PHICH corresponding to PUSCH in subframe #4 six subframes earlier defined by $I_{PHICH}=0$.

FIG. 6B illustrates resources of PHICH corresponding to the legacy terminal and the TDD eIMTA terminal within a PHICH resource region. Here, a case will be considered where a parameter set ($I_{PRB\_RA}$, $n_{DMRS}$) for PUSCH assignment in subframe #3 in the legacy terminal (Config#0) and UL grant indicating the PUSCH is identical to a parameter set ($I_{PRB\_RA}$, $n_{DMRS}$) for PUSCH assignment in subframe #4 in the TDD eIMTA terminal (Config#6) and UL grant indicating the PUSCH. This means that PUSCH of the legacy terminal in subframe #3 and PUSCH of the TDD eIMTA terminal in subframe #4 have cyclic shift values corresponding to the same leading PRB index and the same DMRS. At this time, $I_{PHICH}=0$ is defined for PHICH corresponding to each PUSCH. Therefore, as shown in FIG. 6B, PHICH resources for PUSCH transmission in subframe #3 for the legacy terminal (Config#0) and PHICH resources for PUSCH transmission for the TDD eIMTA terminal (Config#6) in subframe #4 conflict with each other.

This causes a problem in that PHICH for each PUSCH is not correctly indicated to each terminal unnecessary retransmission is generated or retransmission is not performed when retransmission is necessary, for example. In addition, a problem similar to that in FIG. 6B also occurs when Config#0 is set in the legacy terminal and Config#3 is set in the TDD eIMTA terminal (not shown), for example.

Next, FIG. 7A illustrates an example of a case where Config#6 is set in the legacy terminal and Config#0 is set in the TDD eIMTA terminal. That is, in FIG. 7A, in subframe #0, the legacy terminal receives PHICH corresponding to PUSCH in subframe #4 six subframes earlier defined by $I_{PHICH}=0$. On the other hand, the TDD eIMTA terminal receives PHICH corresponding to PUSCH in subframe #3 seven subframes earlier defined by $I_{PHICH}=0$ and further receives PHICH corresponding to PUSCH in subframe #4 six subframes earlier defined by $I_{PHICH}=1$.

FIG. 7B illustrates resources of PHICH for the legacy terminal and the TDD eIMTA terminal within the PHICH resource region. Here, a case will be considered where a parameter set ($I_{PRB\_RA}$, $n_{DMRS}$) corresponding to PUSCH assignment of subframe #4 in the legacy terminal (Config#6) and UL grant indicating the PUSCH is identical to a parameter set ($I_{PRB\_RA}$, $n_{DMRS}$) corresponding to PUSCH assignment of subframe #3 in the TDD eIMTA terminal (Config#0) and UL grant indicating the PUSCH. This means that PUSCH of the legacy terminal in subframe #4 and PUSCH of the TDD eIMTA terminal in subframe #3 have cyclic shift values corresponding to the same leading PRB index and the same DMRS. At this time, $I_{PHICH}=0$ is defined for PHICH corresponding to each PUSCH. Therefore, as shown in FIG. 7B, PHICH resources for PUSCH transmission in subframe #4 in the legacy terminal (Config#6) and PHICH resources for PUSCH transmission in subframe #3 in the TDD eIMTA terminal (Config#0) conflict with each other.

This causes a problem in that PHICH for each PUSCH is not correctly indicated to each terminal and unnecessary retransmission is generated or retransmission is not performed when it is necessary. In addition, a problem similar to those in FIG. 7B also occurs when Config#3 is set in the legacy terminal and Config#0 is set in the TDD eIMTA terminal (not shown), for example.

An object of the present invention is to provide a terminal apparatus, a base station apparatus, a reception method and a transmission method capable of avoiding a conflict between PHICH resources when there is a mixture of terminals in which different UL-DL configurations are set.

Solution to Problem

A terminal apparatus according to an aspect of the present invention is a terminal apparatus capable of changing setting of a configuration pattern of subframes which make up a single frame to one of a plurality of configuration patterns including a subframe in which uplink data is transmitted and a subframe in which a response signal in response to the uplink data is transmitted, the terminal apparatus including: a receiving section that receives a signal transmitted from a base station apparatus; and a demultiplexing section that demultiplexes the response signal from the signal based on an association between the subframe in which the uplink data is transmitted and a resource to which the response signal is assigned, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

A base station apparatus according to an aspect of the present invention includes: a generation section that generates a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted; an assignment section that assigns the response signal to a resource based on an association between a subframe in which the uplink data is transmitted and the resource to which the response signal is assigned; and a transmitting section that transmits a signal including the response signal, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

A reception method according to an aspect of the present invention is a reception method for terminal apparatus capable of changing setting of a configuration pattern of subframes making up a single frame to one of a plurality of configuration patterns including a subframe in which uplink data is transmitted and a subframe in which a response signal in response to the uplink data is transmitted, the method including: receiving a signal transmitted from a base station apparatus; and demultiplexing the response signal from the signal based on an association between the subframe in which the uplink data is transmitted and a resource to which the response signal is assigned, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

A transmission method according to an aspect of the present invention includes: generating a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted; assigning the response signal to a resource based on an association between a subframe in which the uplink data is transmitted and the resource to which the response signal is assigned; and transmitting a signal including the response signal, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

Advantageous Effects of Invention

According to the present invention, it is possible to avoid a conflict between PHICH resources when there is a mixture of terminals in which different UL-DL configurations are set.

BRIEF DESCRIPTION OF DRAWINGS

FIGS. 3A and 3B are diagrams illustrating factors of number of PHICH groups corresponding to UL-DL configuration and PUSCH-PHICH timing;

FIGS. 12A and 12B are diagrams provided for describing a case where a legacy terminal according to the embodiment of the present invention is UL-DL configuration#0;

FIGS. 13A and 13B are diagrams provided for describing a case where the legacy terminal according to the embodiment of the present invention is UL-DL configuration#3 or 6.

DESCRIPTION OF EMBODIMENTS

Figure 1:
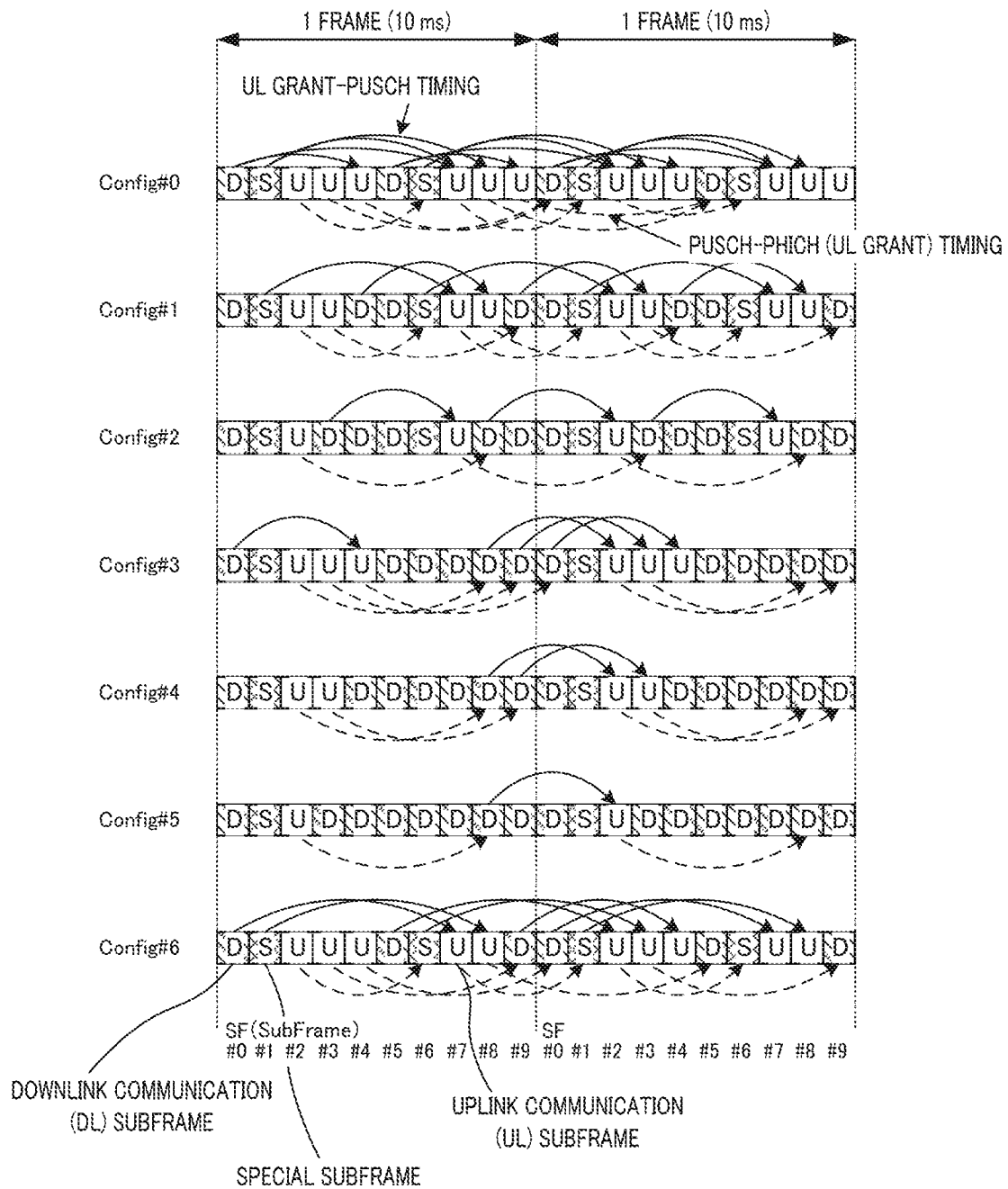
FIG. 1 is a diagram provided for describing UL-DL configuration and UL retransmission control timing in TDD.

Hereinafter, an embodiment of the present invention will be described in detail with reference to the accompanying drawings. Throughout the embodiment, the same elements are assigned the same reference numerals and any duplicate description of the elements is omitted.

Figure 8:
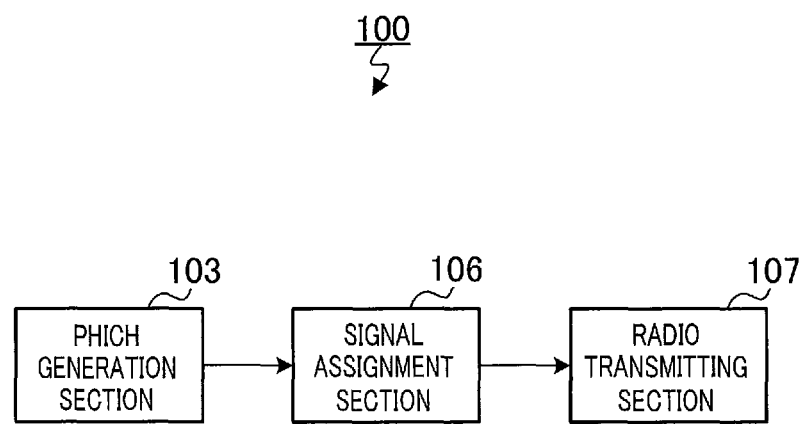
FIG. 8 is a block diagram illustrating a main configuration of a base station according to an embodiment of the present invention.

FIG. 8 is a main configuration diagram of base station 100 according to the present embodiment. In base station 100, PHICH generation section 103 generates a response signal (ACK/NACK signal) in response to uplink data transmitted from terminal 200 whose setting can be changed to one of a plurality of configuration patterns (UL-DL configurations) of subframes making up one frame, each configuration pattern including a subframe in which uplink data is transmitted and a subframe in which a response signal (ACK/NACK signal) in response to the uplink data is transmitted. Signal assignment section 106 assigns a response signal to a PHICH resource based on an association between a subframe in which uplink data is transmitted and a resource (PHICH resource ($I_{PHICH}$)) to which the response signal is assigned. Radio transmitting section 107 transmits a signal including the response signal.

Figure 9:
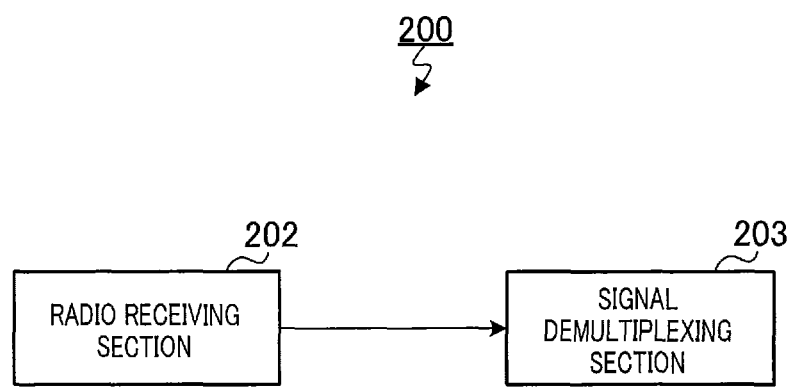
FIG. 9 is a block diagram illustrating a main configuration of a terminal according to the embodiment of the present invention.

FIG. 9 is a main configuration diagram of terminal 200 according to the present embodiment. Terminal 200 is a terminal whose setting can be changed to one of a plurality of configuration patterns (UL-DL configurations) of subframes making up one frame, each configuration pattern including a subframe in which uplink data is transmitted and a subframe in which a response signal (ACK/NACK signal) in response to the uplink data is transmitted. Radio receiving section 202 receives a signal transmitted from base station 100. Signal demultiplexing section 203 demultiplexes the signal into a response signal based on an association between a subframe in which uplink data is transmitted and a resource (PHICH resource ($I_{PHICH}$)) to which a response signal is assigned.

In a first configuration pattern set in terminal 200 (TDD eIMTA terminal), when a response signal transmitted in a first subframe corresponds to uplink data transmitted in a second subframe, a response signal transmitted in the first subframe corresponds to uplink data transmitted in a third subframe different from the second subframe in a second configuration pattern set in another terminal (non-TDD eIMTA terminal) whose configuration pattern setting cannot be changed, in the first subframe, a first resource (PHICH resource) assigned to a response signal in response to uplink data transmitted from terminal 200 in the second subframe is different from a second resource (PHICH resource) assigned to a response signal in response to uplink data transmitted from the other terminal in the third subframe.

[Configuration of Base Station 100]

Figure 10:
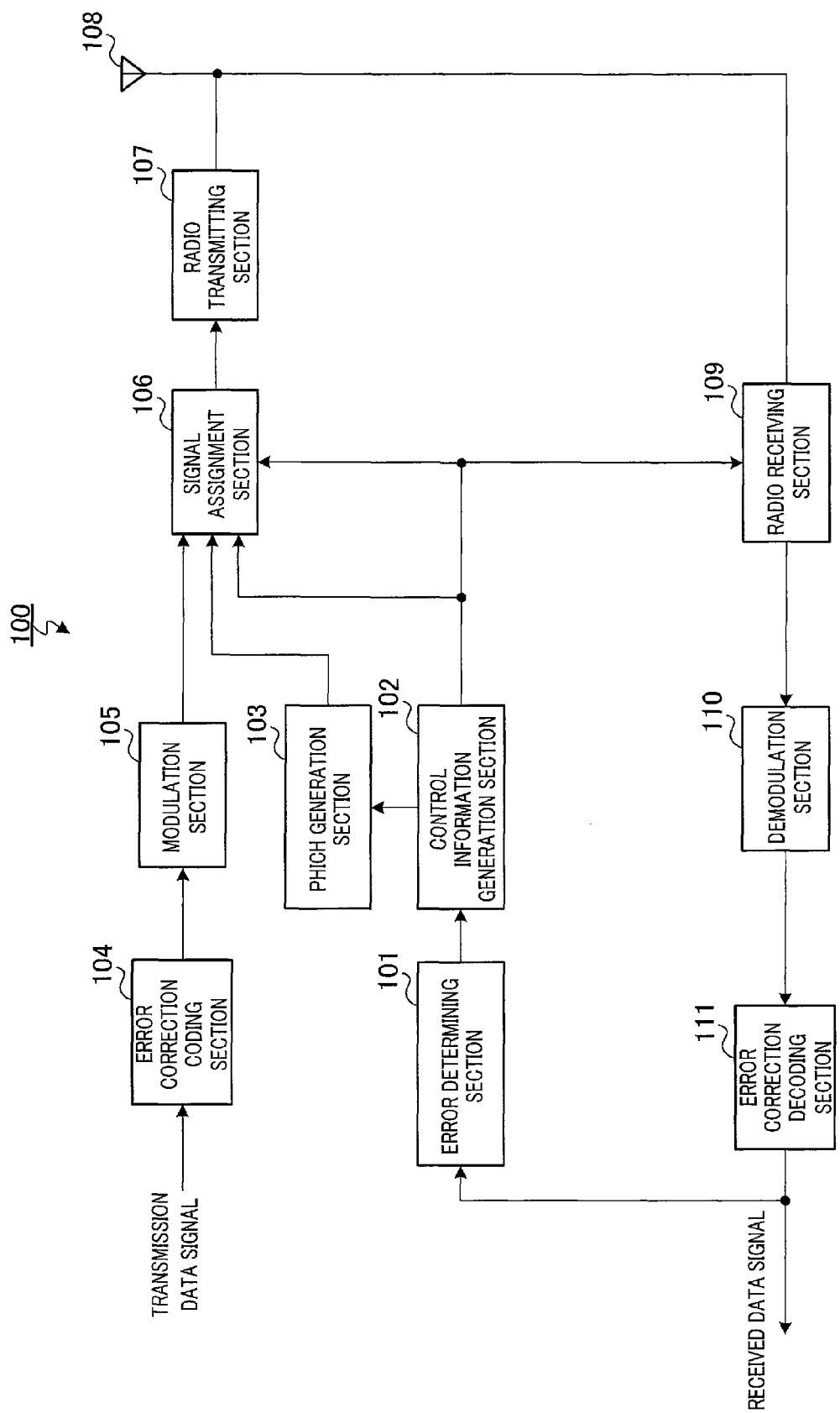
FIG. 10 is a block diagram illustrating a configuration of the base station according to the embodiment of the present invention.

FIG. 10 is a block diagram illustrating a configuration of base station 100 according to the embodiment of the present invention.

In FIG. 10, using CRC or the like, error determining section 101 determines whether or not there is any error in a data signal (uplink data) received from error correction decoding section 111 which will be described later. The determination result is outputted to control information generation section 102.

When there is a data signal to be transmitted over the downlink, control information generation section 102 determines a resource to which the data signal is assigned and generates DL assignment which is assignment information. When there is a data signal to be assigned to the uplink, control information generation section 102 determines a resource to which the data signal is assigned and generates UL grant which is assignment information. Note that control information generation section 102 determines whether or not to retransmit the signal (that is, uplink data) to the terminal based on the determination result received from error determining section 101. The generated assignment information is outputted to signal assignment section 106 as information to be transmitted by PDCCH (or EPDCCH). The DL assignment is also outputted to signal assignment section 106 as control information for transmitting downlink data. The UL grant is outputted to radio receiving section 109 to receive uplink data.

Based on the determination result received from error determining section 101, if a signal need not be retransmitted by the terminal or a signal is adaptively retransmitted, control information generation section 102 instructs PHICH generation section 103 to generate an ACK. On the other hand, if a signal is non-adaptively retransmitted by the terminal, control information generation section 102 instructs PHICH generation section 103 to generate a NACK.

PHICH generation section 103 generates an ACK/NACK signal (ACK or NACK, that is, a response signal in response to uplink data transmitted from the TDD eIMTA terminal or non-TDD eIMTA terminal) according to an instruction from control information generation section 102. One of a plurality of UL-DL configurations (e.g., Config#0 to #6) is set in the terminal that has transmitted uplink data corresponding to the ACK/NACK signal. PHICH generation section 103 outputs the generated ACK/NACK signal to signal assignment section 106.

Error correction coding section 104 performs error correction coding on a transmission data signal (that is, a downlink data signal) and outputs the coded signal to modulation section 105.

Modulation section 105 modulates the signal received from error correction coding section 104 and outputs the modulated signal to signal assignment section 106.

Signal assignment section 106 allocates the modulated signal received from modulation section 105 to a resource based on the DL assignment received from control information generation section 102. In addition, signal assignment section 106 assigns DCI including the DL assignment and the UL grant received from control information generation section 102 to a resource region of PDCCH (PDCCH region) (or a resource region of EPDCCH (EPDCCH region)). Furthermore, when an ACK/NACK signal is outputted from PHICH generation section 103, signal assignment section 106 assigns the ACK/NACK signal to the resource region of PHICH. Signal assignment section 106 assigns a response signal to a PHICH resource based on an association between an uplink communication subframe in which uplink data is transmitted and the PHICH resource ($I_{PHICH}$) (which will be described later).

In this way, a transmission data signal, control information (assignment information (DL assignment, UL grant) or the like) and PHICH signal (ACK/NACK signal) are assigned to predetermined resources and a transmission signal is thereby generated. The generated transmission signal is outputted to radio transmitting section 107.

Radio transmitting section 107 applies predetermined radio transmission processing such as up-conversion to the transmission signal received from signal assignment section 106 and transmits the transmission signal via antenna 108.

Radio receiving section 109 receives a signal transmitted from the terminal via antenna 108 and applies predetermined radio reception processing such as down-conversion thereto. Radio receiving section 109 then demultiplexes the signal transmitted from the terminal using the UL grant received from control information generation section 102 and outputs the signal to demodulation section 110.

Demodulation section 110 applies demodulation processing to the signal received from radio receiving section 109 and outputs the demodulated signal obtained to error correction decoding section 111.

Error correction decoding section 111 decodes the demodulated signal received from demodulation section 110 and obtains a received data signal. The received data signal obtained is also outputted to error determining section 101.

[Configuration of Terminal 200]

Figure 11:
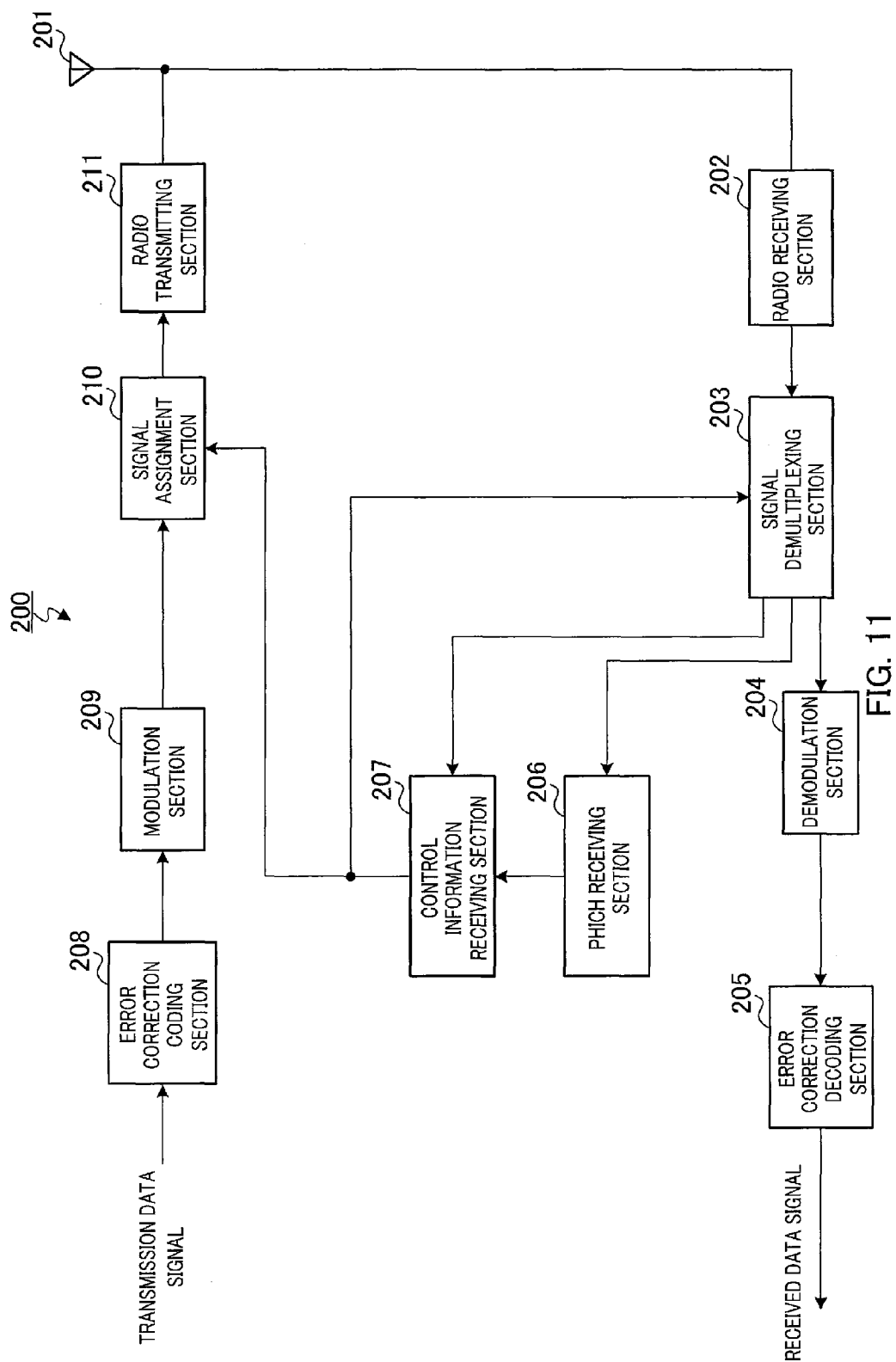
FIG. 11 is a block diagram illustrating a configuration of the terminal according to the embodiment of the present invention.

FIG. 11 is a block diagram illustrating a configuration of terminal 200 according to the present embodiment.

In FIG. 11, radio receiving section 202 receives a signal transmitted from base station 100 via antenna 201 and applies predetermined radio reception processing such as down-conversion and outputs the signal subjected to the radio reception processing to signal demultiplexing section 203.

Signal demultiplexing section 203 extracts a PHICH region signal (ACK/NACK signal) and a PDCCH region signal (control information) from the signal received from radio receiving section 202 and outputs the extracted PHICH region signal and PDCCH region signal to PHICH receiving section 206 and control information receiving section 207 respectively. Signal demultiplexing section 203 demultiplexer the response signal from the received signal based on an association between an uplink communication subframe in which uplink data is transmitted and the PHICH resource ($I_{PHICH}$) (which will be described later).

Signal demultiplexing section 203 extracts a signal assigned to a data resource indicated by the DL assignment received from control information receiving section 207 which will be described later (that is, downlink data signal) from the received signal and outputs the extracted signal to demodulation section 204.

Demodulation section 204 demodulates the signal received from signal demultiplexing section 203 and outputs the demodulated signal to error correction decoding section 205.

Error correction decoding section 205 decodes the demodulated signal received from demodulation section 204 and outputs the received data signal obtained.

PHICH receiving section 206 determines whether the PHICH region signal extracted by signal demultiplexing section 203 is ACK or NACK. The determination result is outputted to control information receiving section 207.

Control information receiving section 207 performs blind decoding on the PDCCH region signal extracted by signal demultiplexing section 203 and thereby extracts control information (e.g., DL assignment or UL grant) intended for terminal 200. Control information receiving section 207 outputs the extracted DL assignment to signal demultiplexing section 203 and outputs the UL grant to signal assignment section 210.

Control information receiving section 207 also functions as a retransmission control section and when the determination result received from PHICH receiving section 206 is a NACK and no UL grant is detected, control information receiving section 207 outputs a signal indicating non-adaptive retransmission (retransmission indication signal) to signal assignment section 210. On the other hand, when the determination result received from PHICH receiving section 206 is an ACK and no UL grant is detected, control information receiving section 207 does not output any signal indicating the assignment to signal assignment section 210.

Error correction coding section 208 performs error correction coding on a transmission data signal (that is, uplink data) and outputs the coded signal to modulation section 209.

Modulation section 209 modulates the signal outputted from error correction coding section 208 and outputs the modulated signal to signal assignment section 210.

Upon receiving UL grant from control information receiving section 207, signal assignment section 210 compares an NDI of the UL grant (NDI of the UL grant this time) with the NDI of the last UL grant in the same retransmission process, determines, when there is any change in the NDI, that new data has been assigned and assigns a modulated signal of the new data outputted from modulation section 209 to data resources according to the UL grant. On the other hand, when there is no change in the NDI, signal assignment section 210 determines that retransmission data has been assigned and assigns the modulated signal of the retransmission data outputted from modulation section 209 to data resources according to the UL grant. Upon receiving a retransmission indication signal from control information receiving section 207, signal assignment section 210 allocates the modulated signal of the retransmission data outputted from modulation section 209 to data resources according to the last UL grant in the same retransmission process. The assigned signal is outputted to radio transmitting section 211 as a transmission signal.

Radio transmitting section 211 applies predetermined radio transmission processing such as up-conversion to the transmission signal received from signal assignment section 210 and transmits the transmission signal via antenna 201.

[Operations of Base Station 100 and Terminal 200]

Operations of base station 100 and terminal 200 configured as described above will be described in detail. Here, a TDD eIMTA terminal (terminal 200) whose setting can be changed to one of a plurality of UL-DL configurations and a non-TDD eIMTA terminal (including the legacy terminal) whose UL-DL configuration setting cannot be changed coexist in the same cell covered by base station 100.

The TDD eIMTA terminal (terminal 200) is first connected to a cell that supports TDD eIMTA using UL-DL configuration which is SIB1-indicated as UL-DL configuration for connection to a cell. The TDD eIMTA terminal may be changed to a different UL-DL configuration based on an instruction of base station 100 in the cell after the cell connection. That is, the TDD eIMTA terminal can know not only a UL-DL configuration set in the TDD eIMTA but also an SIB1-indicated UL-DL configuration used by the non-TDD eIMTA terminal.

Subframe #0 corresponds to the subframe in which a conflict between PHICH resources may occur between the legacy terminal and the TDD eIMTA terminal (terminal 200) in FIGS. 6A and 6B and FIGS. 7A and 7B as described above. More specifically, as shown in FIGS. 6A and 6B and FIGS. 7A and 7B, there is a combination (subframe #3 (seven subframes earlier) and subframe #4 (six subframes earlier)) in which an uplink communication subframe associated with subframe #0 (subframe in which an ACK/NACK signal is transmitted) in UL-DL configuration set in the TDD eIMTA terminal is different from an uplink communication subframe associated with subframe #0 in UL-DL configuration set in the non-TDD eIMTA terminal (see FIG. 3B). Resource regions corresponding to $I_{PHICH}=0$ are associated with ACK/NACK signals in response to uplink data transmitted in these different uplink communication subframes respectively (see FIG. 3B). For this reason, in FIGS. 6A and 7A, in subframe #0, a conflict between PHICH resources may occur between the legacy terminal and the TDD eIMTA terminal.

In other words, when an ACK/NACK signal transmitted in the first subframe (subframe #0 in FIGS. 6A and 7A) in the UL-DL configuration set in the TDD eIMTA terminal corresponds to uplink data transmitted in the second subframe (subframe #4 in FIG. 6A, subframe #3 in FIG. 7A), and an ACK/NACK signal transmitted in the first subframe (subframe #0 in FIGS. 6A, 7A) in the UL-DL configuration set in the non-TDD eIMTA terminal corresponds to uplink data transmitted in a third subframe (subframe #3 in FIG. 6A, subframe #4 in FIG. 7A) different from the second subframe, a conflict between PHICH resources may occur between the non-TDD eIMTA terminal and the TDD eIMTA terminal in the first subframe.

Focusing on these points, in subframes in which a conflict between PHICH resources may occur between the legacy terminal and the TDD eIMTA terminal, base station 100 and terminal 200 change the association (0 or 1) of $I_{PHICH}$ with PHICH intended for the legacy terminal for PHICH intended for the TDD eIMTA terminal. That is, in the subframe, base station 100 and terminal 200 use a value obtained by inverting the value of $I_{PHICH}$ (e.g., FIG. 3B) corresponding to the legacy terminal as $I_{PHICH}$ corresponding to the TDD eIMTA terminal.

By so doing, while, of ACK/NACK signals in response to uplink data transmitted in different uplink communication subframes between the legacy terminal and the TDD eIMTA terminal in the subframe, PHICH resources for the ACK/NACK signal intended for the legacy terminal are resources in the resource region of $I_{PHICH}=0$ as described above, base station 100 and terminal 200 can use PHICH resources for ACK/NACK signals intended for terminal 200 as resources in the resource region of $I_{PHICH}=1$. That is, in subframe #0, different PHICH resources are assigned to ACK/NACK signals in response to uplink data transmitted in different uplink communication subframes between the legacy terminal and the TDD eIMTA terminal.

By this means, the present embodiment uses different PHICH resources between the legacy terminal and the TDD eIMTA terminal, applies non-adaptive retransmission to corresponding PHICHs and thereby eliminate the aforementioned conflict between PHICH resources.

Next, the operation will be described in detail focusing on the following two cases.

<Case 1>: When Config#0 is set in non-TDD eIMTA terminal and Config#3 or Config#6 is set in TDD eIMTA terminal <Case 2>: When Config#3 or Config#6 is set in non-TDD eIMTA terminal and Config#0 is set in TDD eIMTA terminal <Case 1 (FIG. 12)>

For example, as shown in FIG. 12A, in subframe #0 in which a conflict between PHICH resources may occur between the legacy terminal (Config#0) and the TDD eIMTA terminal (terminal 200) (Config#3 or Config#6), base station 100 (e.g., signal assignment section 106) changes the association of $I_{PHICH}$ of PHICH resources intended for terminal 200 compared to the association (e.g., FIG. 3B) of $I_{PHICH}$ used by the legacy terminal. That is, as shown in FIG. 12A, in subframe #0, base station 100 associates the PHICH resources corresponding to uplink data (PUSCH) of subframe #4 with $I_{PHICH}=1$ for terminal 200.

Figure 2:
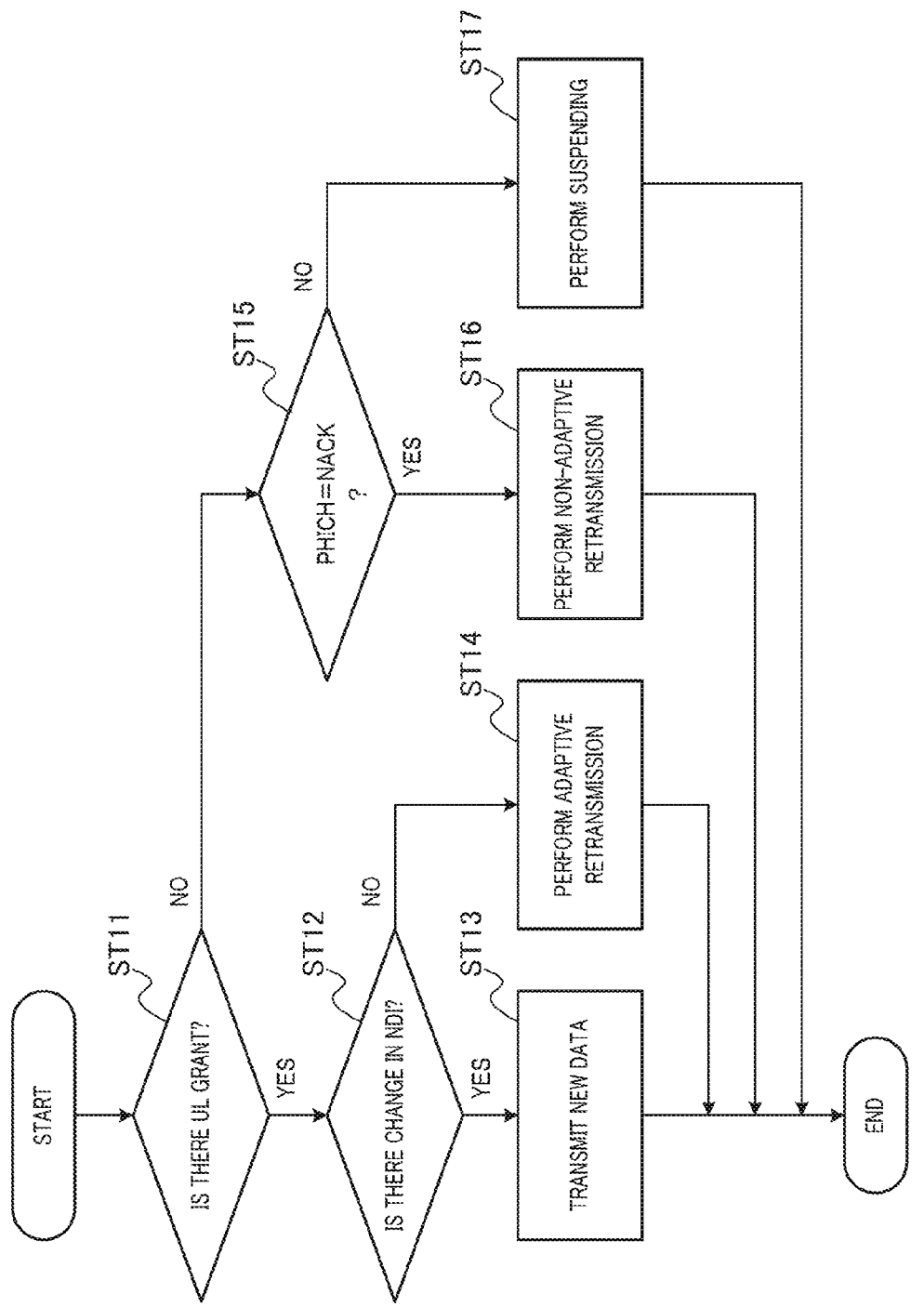
FIG. 2 is a flowchart illustrating an uplink communication retransmission control procedure.
Figure 4A:
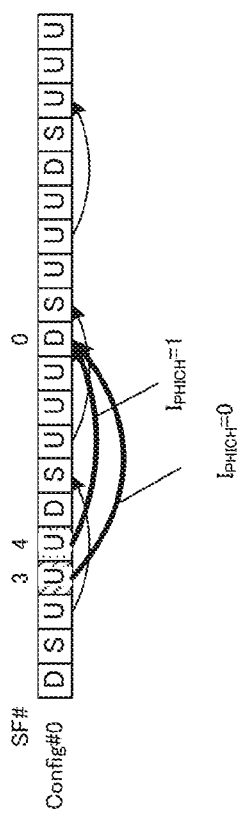
FIGS. 4A and 4B are diagrams illustrating a method of determining PHICH resources corresponding to PUSCH-PHICH timing.
Figure 4B:
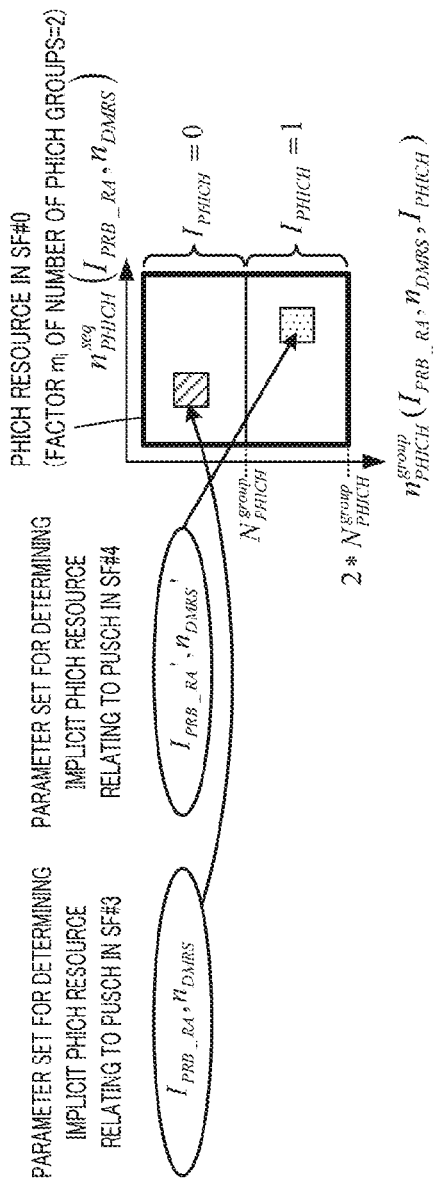
Figure 5:
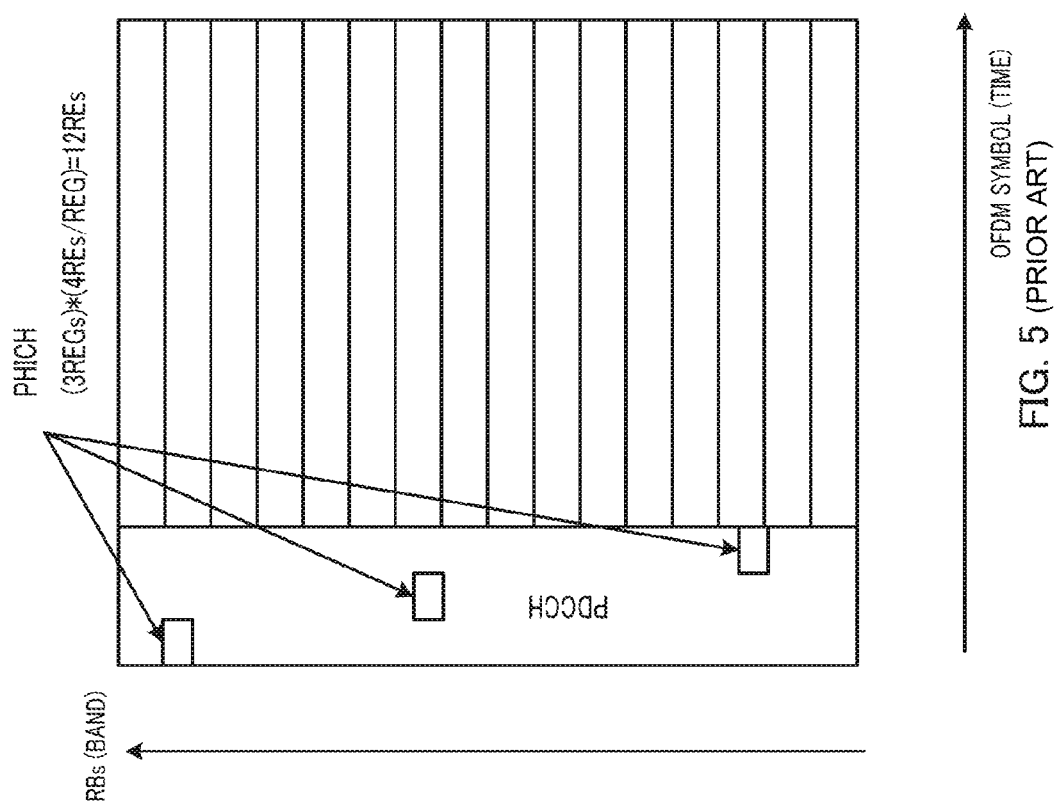
FIG. 5 is a diagram illustrating an example of PHICH mapping.
Figure 6A:
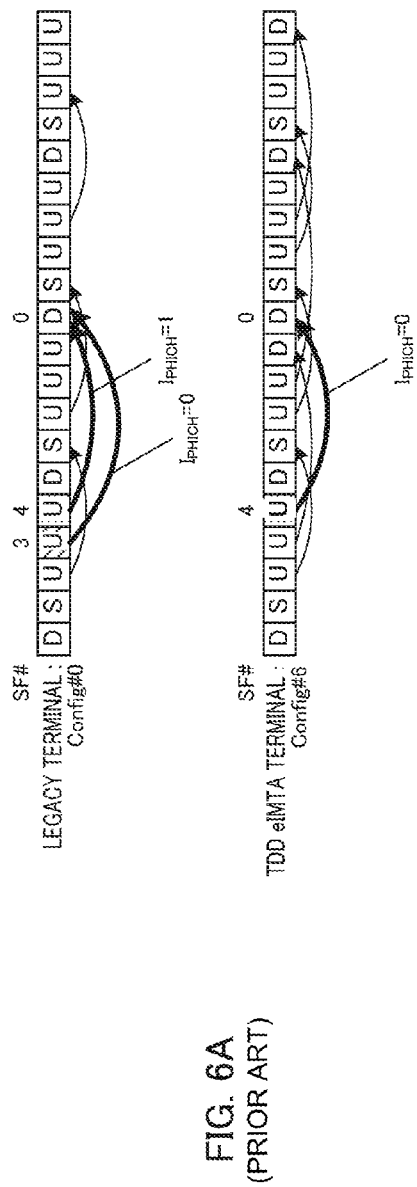
FIGS. 6A and 6B are diagrams provided for describing problems involved in a case where a legacy terminal is UL-DL configuration#0.
Figure 6B:
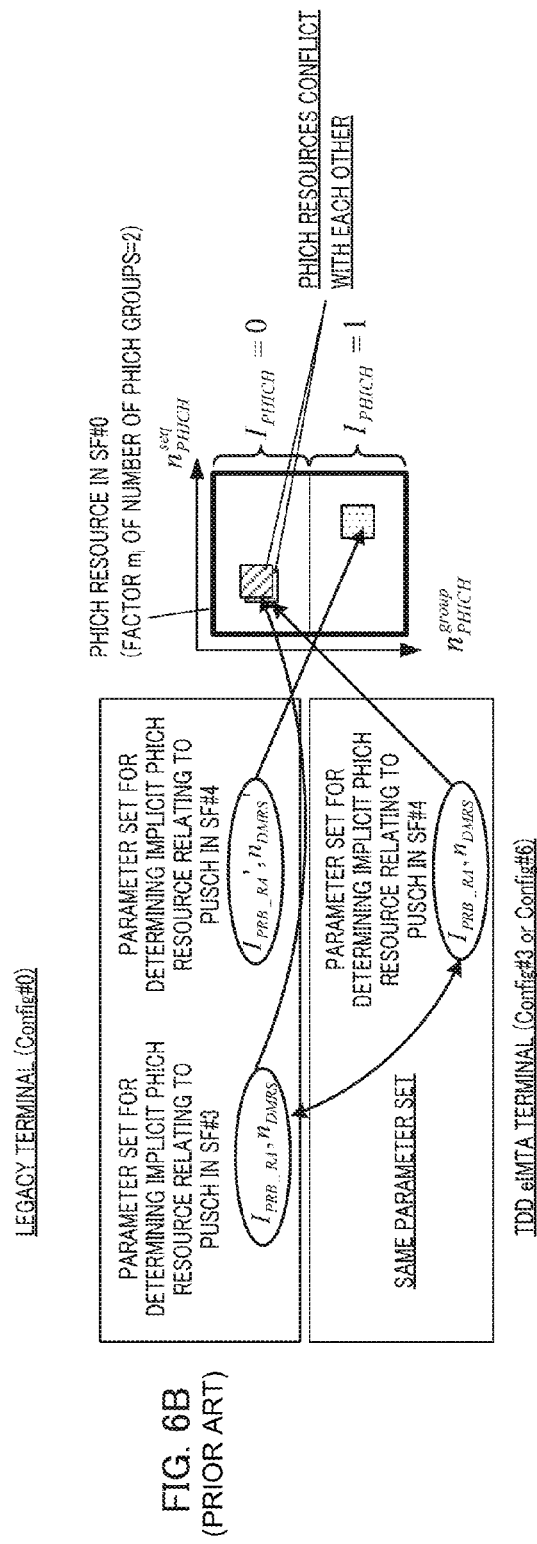
Figure 7A:
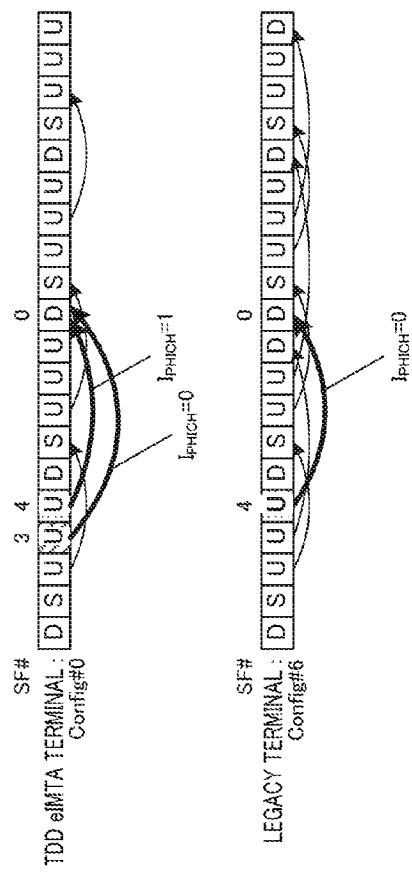
FIGS. 7A and 7B are diagrams provided for describing problems involved in a case where a legacy terminal is UL-DL configuration#3 or 6.
Figure 7B:
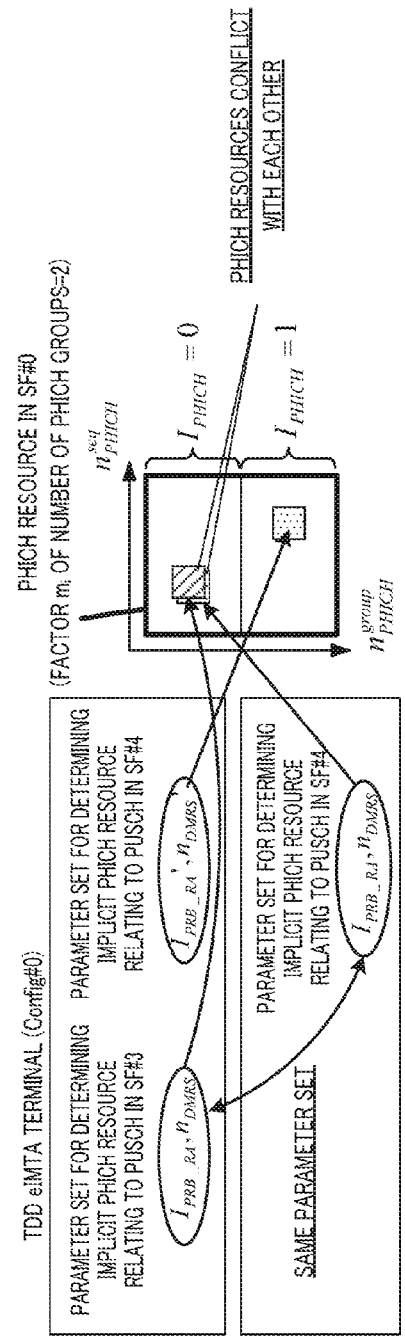

Similarly, in subframe #0, terminal 200 (e.g., signal demultiplexing section 203) recognizes PHICH resources corresponding to uplink data (PUSCH) in subframe #4 as $I_{PHICH}=1$ and detects PHICH. Terminal 200 then performs retransmission control (e.g., FIG. 2) of uplink data based on the detection result of PHICH.

FIG. 12B illustrates PHICH reception timing (PUSCH-PHICH timing) corresponding to uplink data (PUSCH) for terminal 200 and an $I_{PHICH}$ value at each timing in case 1. That is, FIG. 12B shows a state after the above $I_{PHICH}$ value is changed. Base station 100 and terminal 200 may assign or demultiplex ACK/NACK signals based on the association between subframes shown in FIG. 12B in which uplink data is transmitted and PHICH resources ($I_{PHICH}$) to which ACK/NACK signals are assigned.

In subframe #0, FIG. 12B is compared with FIG. 3B. In FIG. 3B, $I_{PHICH}=0$ is associated with a PHICH resource of an ACK/NACK signal transmitted in subframe #0 to a terminal in which Config#3 or Config#6 is set. In contrast, in FIG. 12B, $I_{PHICH}=1$ (area enclosed by a dotted line) is associated with a PHICH resource of an ACK/NACK signal transmitted in subframe #0 to terminal 200 in which Config#3 or Config#6 is set. In, FIG. 12B, as with FIG. 3B, $I_{PHICH}=0$ is associated with PHICH resources of ACK/NACK signals transmitted in subframe #0 to a terminal in which Config#0 is set.

Here, in subframe #0 in which PHICH is transmitted, a parameter set ($I_{PRB_{RA}}$, $n_{DMRS}$) to determine a PHICH resource for uplink data (PUSCH) in subframe #4 in terminal 200 (Config#3 or Config#6) may be identical to a parameter set ($I_{PRB\_RA}$, $n_{DMRS}$) to determine PHICH resources for uplink data (PUSCH) in subframe #3 in the legacy terminal (Config#0).

In contrast, as shown in FIG. 12A and FIG. 12B, by changing the value of $I_{PHICH}$ for terminal 200, different $I_{PHICH}$s, that is, different resource regions are associated with ACK/NACK signals in which, the determination parameter sets ($I_{PRB\_RA}$, $n_{DMRS}$) can be identical in subframe #0 between the legacy terminal and the TDD eIMTA terminal. More specifically, as shown in FIG. 12B, a PHICH resource ($I_{PHICH}=1$) of an ACK/NACK signal for PUSCH in subframe #4 (six subframes earlier) associated with subframe #0 in Config#3 or Config#6 set in the TDD eIMTA terminal is different from a PHICH resource ($I_{PHICH}=0$) of an ACK/NACK signal for PUSCH in subframe #3 (seven subframes earlier) associated with subframe #0 in Config#0 set in the legacy terminal. That is, in subframe #0, the PHICH resource of the ACK/NACK signal for PUSCH in subframe #4 in terminal 200 is included in a region ($I_{PHICH}=1$) different from the region ($I_{PHICH}=0$) including the PHICH resource of the ACK/NACK signal for PUSCH in subframe #3 in the legacy terminal. In this way, $I_{PHICH}$ has different values between the legacy terminal and terminal 200, and it is thereby possible to completely separate both PHICH resources.

Note that in the same subframe, operation is performed such that different PRBs are assigned to uplink data (PUSCH) of terminal 200 and the legacy terminal. Thus, for example, in subframe #4 shown in FIG. 12A, a leading PRB ($I_{PRB\_RA}$) of PRBs occupied by terminal 200 never matches a leading PRB ($I_{PRB\_RA}'$) of PRBs occupied by the legacy terminal. Thus, since $I_{PRB\_RA}$ never matches $I_{PRB\_RA}'$, the PHICH resource determination parameter set ($I_{PRB\_RA}$, $n_{DMRS}$) for uplink data (PUSCH) in subframe #4 in terminal 200 does not match the PHICH resource determination parameter set ($I_{PRB\_RA}'$, $n_{DMRS}'$) for uplink data (PUSCH) in subframe #4 in the legacy terminal. Thus, as shown in FIG. 12A and FIG. 12B, the values of $I_{PHICH}$ for terminal 200 are changed, and although the same region ($I_{PHICH}=0$) is associated with PHICH resources of ACK/NACK signals corresponding to uplink data transmitted in the same uplink communication subframe (subframe #4) between the legacy terminal and the TDD eIMTA terminal in subframe #0, it is possible to completely separate both PHICH resources.

<Case 2 (FIG. 13)>

For example, as shown in FIG. 13A, in subframe #0 in which a conflict between PHICH resources may occur between the legacy terminal (Config#3 or Config#6) and the TDD eIMTA terminal (terminal 200) (Config#0), as with case 1, base station 100 (e.g., signal assignment section 106) changes the association of $I_{PHICH}$ of the PHICH resources intended for terminal 200 compared to the association of $I_{PHICH}$ used by the legacy terminal (e.g., FIG. 3B). That is, as shown in FIG. 13A, in subframe #0, base station 100 associates a PHICH resource corresponding to uplink data (PUSCH) in subframe #3 with $I_{PHICH}=1$ for terminal 200 and associates a PHICH resource corresponding to uplink data (PUSCH) in subframe #4 with $I_{PHICH}=0$.

Similarly, in subframe #0, terminal 200 (e.g., signal demultiplexing section 203) recognizes a resource of PHICH corresponding to uplink data (PUSCH) in subframe #3 as $I_{PHICH}=1$, recognizes a resource of PHICH corresponding to uplink data (PUSCH) in subframe #4 as $I_{PHICH}=0$ and detects PHICH. Terminal 200 performs retransmission control of uplink data based on the PHICH detection result (e.g., FIG. 2).

FIG. 13B illustrates PHICH reception timing (PUSCH-PHICH timing) corresponding to uplink data (PUSCH) for terminal 200 in case 2 and an $I_{PHICH}$ value at each timing. That is, FIG. 13B illustrates a state after the $I_{PHICH}$ value is changed. Base station 100 and terminal 200 may assign or separate ACK/NACK signals based on the association shown in FIG. 13B between subframes in which uplink data is transmitted and PHICH resources ($I_{PHICH}$) to which the ACK/NACK signals are assigned.

In subframe #0, FIG. 13B is compared with FIG. 3B. In FIG. 3B, $I_{PHICH}$=0 is associated with a PHICH resource of an ACK/NACK signal corresponding to PUSCH, seven subframes earlier transmitted in subframe #0 to a terminal in which Config#0 is set and $I_{PHICH}$=1 is associated with a PHICH resource of an ACK/NACK signal corresponding to PUSCH, six subframes earlier. In contrast, in FIG. 13B, $I_{PHICH}$=1 is associated with a PHICH resource of an ACK/NACK signal corresponding to PUSCH, seven subframes earlier transmitted in subframe #0 to terminal 200 in which Config#0 is set, and $I_{PHICH}$=0 is associated with a PHICH resource of an ACK/NACK signal corresponding to PUSCH, six subframes earlier (area enclosed by a dotted line). In FIG. 13B, as with FIG. 3B, $I_{PHICH}$=0 is associated with the PHICH resource of the ACK/NACK signal transmitted in subframe #0 to the terminal in which Config#3 or Config#6 is set.

As shown in FIG. 13A and FIG. 13B, by changing the $I_{PHICH}$ value for terminal 200, different $I_{PHICHs}$, that is, different resource regions are associated with ACK/NACK signals in which PHICH resource determination parameter sets ($I_{PRB\_RA}$, $n_{DMRS}$) are identical between the legacy terminal and the TDD eIMTA terminal in subframe #0 as with case 1. More specifically, as shown in FIG. 13B, the PHICH resource ($I_{PHICH}$=1) of the ACK/NACK signal corresponding to PUSCH in subframe #3 (seven subframes earlier) associated with subframe #0 in Config#0 set in the TDD eIMTA terminal is different from the PHICH resource ($I_{PHICH}$=0) of the ACK/NACK signal corresponding to PUSCH in subframe #4 (six subframes earlier) associated with subframe #0 in Config#3 or Config#6 set in the non-TDD eIMTA terminal. That is, in subframe #0, the PHICH resource of the ACK/NACK signal corresponding to PUSCH in subframe #3 in terminal 200 is included in a region ($I_{PHICH}$=1) different from a region ($I_{PHICH}$=0) including the PHICH resource of the ACK/NACK signal corresponding to PUSCH in subframe #4 in the legacy terminal. In this way, the value of $I_{PHICH}$ differs between the PHICH resource corresponding to uplink data (PUSCH) in subframe #4 in terminal 200 and the PHICH resource corresponding to uplink data (PUSCH) in subframe #4 in the legacy terminal, and it is thereby possible to completely separate both PHICH resources.

As with case 1, operation is performed such that different PRBs are assigned to uplink data (PUSCH) of terminal 200 and the legacy terminal in the same subframe. Thus, for example, as shown in FIG. 13A, the PHICH resource determination parameter set ($I_{PRB\_RA}$, $n_{DMRS}$) corresponding to uplink data (PUSCH) in subframe #4 in terminal 200 does not match the PHICH resource determination parameter set ($I_{PRB\_RA}'$, $n_{DMRS}'$) corresponding to uplink data (PUSCH) in subframe #4 in the legacy terminal. In this way, as shown in FIG. 13A and FIG. 13B, by changing the value of $I_{PHICH}$ for terminal 200, although the identical region ($I_{PHICH}$=0) is associated with PHICH resources of the ACK/NACK signals corresponding to uplink data transmitted in the same uplink communication subframe (subframe #4) between the legacy terminal and the TDD eIMTA terminal in subframe #0, both PHICH resources can be separated completely.

Case 1 and case 2 have been describes so far.

(Effects)

As described above, according to the present embodiment, even when terminals coexist in which different UL-DL configurations are set, it is possible to avoid a conflict between PHICH resources by changing the value of $I_{PHICH}$ in terminal 200 which is a TDD eIMTA terminal in subframes in which a conflict between PHICH resources may occur. Thus, since PHICH for each PUSCH can be indicated to each terminal correctly, it is possible to solve problems that unnecessary retransmission occurs or retransmission is not performed although it is necessary.

(Other Method of Implementing Case 2: FIG. 14)

A case has been described in case 2 (FIG. 12 and FIG. 13) where factor $m_i$ of number of PHICH groups in subframe #0 is set to Config#0 ($m_i$=2) and set to Config#3 or Config#6 ($m_i$=1) whichever is the larger ($m_i$=2). In contrast, a case will be described here where factor $m_i$ of number of PHICH groups in subframe #0 is set to Config#0 ($m_i$=2) and set to Config#3 or Config#6 ($m_i$=1) whichever is the smaller ($m_i$=1).

Figure 14A:
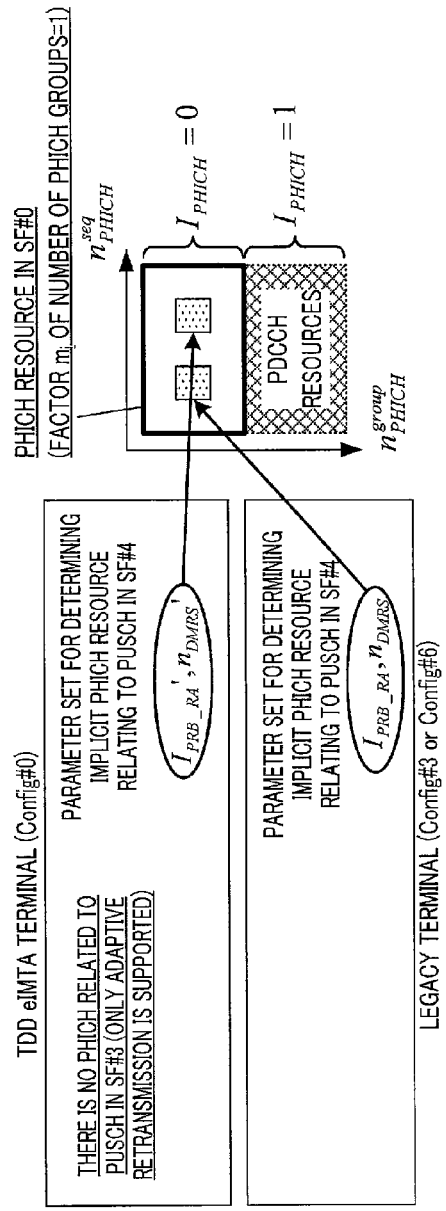
FIGS. 14A and 14B are diagrams provided for describing a case where the legacy terminal according to the embodiment of the present invention is UL-DL configuration#3 or 6.
Figure 14B:
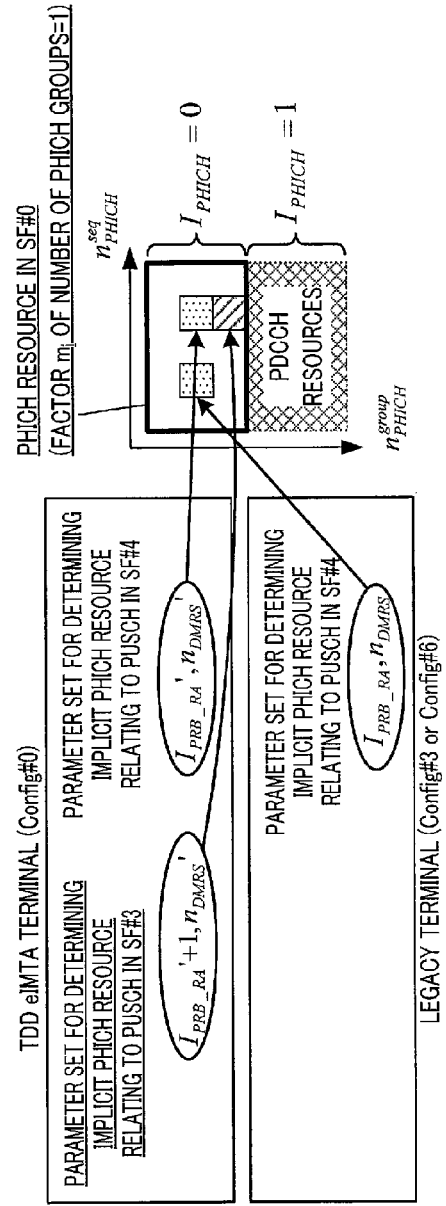

In other words, FIG. 14A and FIG. 14B illustrate examples of cases where factor $m_i$=1 of the PHICH group is set in the TDD eIMTA terminal (terminal 200) (Config#0) so that the number of PHICH resources does not become greater than that when only the legacy terminal (Config#3 or Config#6: $m_i$=1) is operated (so that the overhead of PHICH does not increase). More specifically, FIG. 14A and FIG. 14B illustrate examples in subframe #0 (see FIG. 3A) in which factor $m_i$ of number of PHICH groups for the legacy terminal (Config#3 or Config#6) is smaller than factor $m_i$ of number of PHICH groups for terminal 200 (Config#0).

In the method shown in FIG. 14A, base station 100 does not secure any PHICH resources (PHICH resources for PUSCH transmitted in subframe #3, seven subframes earlier) corresponding to $I_{PHICH}$=1 for terminal 200. Terminal 200 does not receive any PHICH corresponding to $I_{PHICH}$=1 in subframe #0. That is, base station 100 and terminal 200 do not secure any PHICH resources corresponding to $I_{PHICH}$=1 in subframe #0 and always support only adaptive retransmission for PUSCH transmitted in subframe #3. The same method as that in case 2 applies to PHICH corresponding to $I_{PHICH}$=0.

In the method shown in FIG. 14B, base station 100 and terminal 200 secure resources determined based on the parameter set ($I_{PRB\_RA}'$ and $n_{DMRS}'$) that determines a PHICH resource (PHICH resource for PUSCH transmitted in subframe #4, six subframes earlier) corresponding to $I_{PHICH}$=0 as a PHICH resource (PHICH resource for PUSCH transmitted in subframe #3, seven subframes earlier) corresponding to $I_{PHICH}$=1 for terminal 200. In FIG. 14B, when parameters relating to PHICH resources corresponding to $I_{PHICH}$=0 are $I_{PRB\_RA}'$ and $n_{DMRS}'$, base station 100 and terminal 200 assume parameters relating to PHICH resources corresponding to $I_{PHICH}$=1 to be $I_{PRB\_RA}'+1$ and $n_{DMRS}'$. $I_{PRB\_RA}'$ here is an index indicating the leading PRB assigned to uplink data (PUSCH). For this reason, there is a high possibility that $I_{PRB\_RA}'+1$ which is an index (index obtained by adding 1) of PRB adjacent to the PRB corresponding to $I_{PRB\_RA}'$ may also be occupied by the uplink data. That is, at timing at which PRB corresponding to $I_{PRB\_RA}'$ is assigned, the possibility that base station 100 may have assigned uplink data whose leading PRB is PRB corresponding to $I_{PRB\_RA}'+1$ to terminals other than terminal 200 is low. Therefore, even when base station 100 uses PHICH resources associated with $I_{PRB\_RA}'+1$ in addition to PHICH resources associated with $I_{PRB\_RA}'+1$ for terminal 200, it is possible to reduce the possibility that constraints may be produced on scheduling for other terminals.

(Effects)

Thus, in the other method of implementing case 2, as with case 2, it is possible to completely avoid a conflict between PHICH resources by changing the value of $I_{PHICH}$. Moreover, the other method of implementing case 2 also has the effect of not increasing the overhead of PHICH compared to a case where operation is performed using only the legacy terminal.

The embodiment of the present invention has been described so far.

Other Embodiments (1) In the above embodiment, the TDD eIMTA terminal (terminal 200) can know not only the UL-DL configuration set therein but also the SIB1-indicated UL-DL configuration used by the non-TDD eIMTA terminal. However, the present embodiment is not limited to this, but the TDD eIMTA terminal need not always reference the SIB1-indicated UL-DL configuration used by the non-TDD eIMTA terminal.

That is, when Config#3 or Config#6 is set in the TDD eIMTA terminal (terminal 200), base station 100 (e.g., signal assignment section 106) always changes the association of PHICH resources intended for terminal 200 with $I_{PHICH}$ in subframe #0 irrespective of the UL-DL configuration used by the legacy terminal.

Similarly, when Config#3 or Config#6 is set in the TDD eIMTA terminal (terminal 200), in subframe #0, terminal 200 (e.g., signal demultiplexing section 203) always recognizes PHICH resources corresponding to uplink data (PUSCH) in subframe #4 as $I_{PHICH}=1$ and detects PHICH irrespective of the UL-DL configuration used by the legacy terminal. Terminal 200 then performs retransmission control of uplink data (e.g., FIG. 2) based on the PHICH detection result.

When Config#0 is set in the TDD eIMTA terminal (terminal 200), base station 100 (e.g., signal assignment section 106) always changes the association of PHICH resources intended for terminal 200 with $I_{PHICH}$ in subframe #0 irrespective of the UL-DL configuration used by the legacy terminal. That is, in subframe #0, base station 100 associates a PHICH resource corresponding to uplink data (PUSCH) in subframe #3 with $I_{PHICH}=1$ for terminal 200 and associates a PHICH resource corresponding to uplink data (PUSCH) in subframe #4 with $I_{PHICH}=0$.

Similarly, when Config#0 is set in the TDD eIMTA terminal (terminal 200), in subframe #0, terminal 200 (e.g., signal demultiplexing section 203) always recognizes a PHICH resource corresponding to uplink data (PUSCH) in subframe #3 as $I_{PHICH}=1$ irrespective of the UL-DL configuration used by the legacy terminal, always recognizes a PHICH resource corresponding to uplink data (PUSCH) in subframe #4 as $I_{PHICH}=0$ and detects PHICH. Terminal 200 then performs retransmission control of uplink data based on the PHICH detection result (e.g., FIG. 2).

This allows base station 100 to determine PHICH resources irrespective of the SIB1-indicated UL-DL configuration used by the non-TDD eIMTA terminal, making it possible to simplify the configuration of base station 100 (e.g., signal assignment section 106). Similarly, since terminal 200 can detect PHICH resources irrespective of the SIB1-indicated UL-DL configuration used by the non-TDD eIMTA terminal, making it possible to simplify the configuration of terminal 200 (e.g., signal demultiplexing section 203).

(2) Moreover, in the above embodiment, as the method of indicating. UL-DL configuration for TDD eIMTA set in a TDD eIMTA terminal (terminal 200), one of the following indication methods may be adopted: method of indicating an RRC (higher layer) signaling base, method of indicating a MAC (Media Access Control layer) signaling base and method of indicating a L1 (Physical Layer) signaling base. When UL-DL configuration for TDD eIMTA set in a TDD eIMTA terminal is different from SIB1-indicated UL-DL configuration used in a non-TDD eIMTA terminal (legacy terminal), the method of indicating an SI (System Information) signaling base may be adopted as the method of indicating UL-DL configuration for TDD eIMTA set in the TDD eIMTA terminal.

(3) "UL-DL configuration for TDD eIMTA set in a TDD eIMTA terminal" has been described in the above embodiment. However, this is based on the premise that "UL-DL configuration for TDD eIMTA set in the TDD eIMTA terminal" and "UL-DL configuration referencing timing relating to uplink control that defines the factor of number of PHICH groups (that is, PHICH reception timing corresponding to uplink data (PUSCH)" are the same.

However, in an LTE-A system, according to TDD inter-band CA (Carrier Aggregation), when different UL-DL configurations are indicated among a plurality of component carriers to which carrier aggregation is applied, UL-DL configuration that indicates a subframe configuration within one frame may be different from UL-DL configuration referencing timing relating to uplink control (hereinafter, may also be referred to as "UL-DL configuration for timing reference").

When TDD inter-band CA is operated in combination with TDD eIMTA, "UL-DL configuration for TDD eIMTA set in the TDD eIMTA terminal" in the above embodiment is different from "UL-DL configuration for timing reference" referenced by the TDD eIMTA terminal Therefore, in the above embodiment, the "UL-DL configuration for TDD eIMTA set in the TDD eIMTA terminal" may be regarded as "UL-DL configuration at timing relating to uplink control referenced by the TDD eIMTA terminal."

(4) Each of the embodiments has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna formed of a plurality of antennas and/or the like.

For example, LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

(5) In the foregoing embodiments, the present invention is configured with hardware by way of example, but the present invention can be also implemented by software in conjunction with hardware.

In addition, the functional blocks used in the descriptions of the embodiments are typically implemented as LSI devices, which are integrated circuits. These functional blocks may be formed as individual chips, or part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As has been described above, the terminal apparatus according to the present disclosure is a terminal apparatus capable of changing setting of a configuration pattern of subframes which make up a single frame to one of a plurality of configuration patterns including a subframe in which uplink data is transmitted and a subframe in which a response signal in response to the uplink data is transmitted, the terminal apparatus including: a receiving section that receives a signal transmitted from a base station apparatus; and a demultiplexing section that demultiplexes the response signal from the signal based on an association between the subframe in which the uplink data is transmitted and a resource to which the response signal is assigned, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

In the terminal apparatus according to this disclosure, the first resource is included in a region different from a region including the second resource.

In the terminal apparatus according to this disclosure, when the response signal intended for the terminal apparatus transmitted in the first subframe is a response signal in response to the uplink data transmitted in the second subframe and the uplink data transmitted in the third subframe, the first resource is a resource associated with a physical resource block having an index obtained by adding one to an index of a physical resource block used for the uplink data transmitted in the third subframe.

A base station apparatus according to this disclosure includes: a generation section that generates a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted; an assignment section that assigns the response signal to a resource based on an association between a subframe in which the uplink data is transmitted and the resource to which the response signal is assigned; and a transmitting section that transmits a signal including the response signal, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

A reception method according to the present disclosure is a reception method for terminal apparatus capable of changing setting of a configuration pattern of subframes making up a single frame to one of a plurality of configuration patterns including a subframe in which uplink data is transmitted and a subframe in which a response signal in response to the uplink data is transmitted, the method including: receiving a signal transmitted from a base station apparatus; and demultiplexing the response signal from the signal based on an association between the subframe in which the uplink data is transmitted and a resource to which the response signal is assigned, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

A transmission method according to this disclosure includes: generating a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted; assigning the response signal to a resource based on an association between a subframe in which the uplink data is transmitted and the resource to which the response signal is assigned; and transmitting a signal including the response signal, in which, when a response signal transmitted in a first subframe of a first configuration pattern set in the terminal apparatus corresponds to uplink data transmitted in a second subframe and a response signal transmitted in the first subframe of a second configuration pattern set in another terminal apparatus that is not capable of changing the setting of the configuration pattern corresponds to uplink data transmitted in a third subframe different from the second subframe, in the first subframe, a first resource assigned to the response signal in response to the uplink data transmitted from the terminal apparatus in the second subframe is different from a second resource assigned to the response signal in response to the uplink data transmitted from the other terminal apparatus in the third subframe.

The disclosure of Japanese Patent Application No. 2012-238995, filed on Oct. 30, 2012, including the specification, drawings and abstract is incorporated herein by reference in its entirety.

INDUSTRIAL APPLICABILITY

The present invention is useful in mobile communication systems, for example.

REFERENCE SIGNS LIST

100 Base station
200 Terminal
101 Error determining section
102 Control information generation section
103 PHICH generation section
104, 208 Error correction coding section
105, 209 Modulation section
106, 210 Signal assignment section
107, 211 Radio transmitting section
108, 201 Antenna
109, 202 Radio receiving section
110, 204 Demodulation section
111, 205 Error correction decoding section
203 Signal demultiplexing section
206 PHICH receiving section
207 Control information receiving section

The invention claimed is:

1. A terminal apparatus capable of changing settings of a configuration pattern of subframes which make up a single frame to one of a plurality of configuration patterns including a subframe in which uplink data is transmitted and a subframe in which a response signal in response to the uplink data is transmitted, the terminal apparatus comprising:
a receiver, which, in operation, receives a signal transmitted from a base station apparatus; and
circuitry, which, in operation, demultiplexes, based on an association between the subframe in which the uplink data is transmitted and a resource to which the response signal is assigned, the response signal that is assigned to the resource from the signal, wherein,
when all the following conditions: (i) a first configuration pattern is set in the terminal apparatus, (ii) a second configuration pattern is set in another terminal apparatus that is not capable of changing the setting of the configuration pattern, (iii) a response signal transmitted in a first subframe of the first configuration pattern is a response signal to uplink data transmitted in a second subframe, and (iv) a response signal transmitted in the first subframe of the second configuration pattern is a response signal to uplink data transmitted in a third subframe different from the second subframe, are satisfied:
the circuitry demultiplexes the response signal, wherein in the first subframe, a first resource assigned to the response signal in response to the uplink data transmitted from the terminal apparatus in the second subframe is different from a second resource assigned to the response signal in response to the uplink data transmitted from the another terminal apparatus in the third subframe; and
when the response signal intended for the terminal apparatus transmitted in the first subframe is a response signal in response to the uplink data transmitted in the second subframe and the uplink data transmitted in the third subframe, the first resource is a resource associated with a physical resource block having an index obtained by adding one to an index of a physical resource block associated with a third resource assigned to the response signal in response to the uplink data transmitted from the terminal apparatus in the third subframe.

2. A base station apparatus comprising:
circuitry, which, in operation:
generates a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted; and
assigns, based on an association between a subframe in which the uplink data is transmitted and a resource to which the response signal is assigned, the response signal to the resource to which the response signal is assigned; and
a transmitter, which, in operation, transmits a signal including the response signal, wherein,
when all the following conditions: (i) a first configuration pattern is set in the terminal apparatus, (ii) a second configuration pattern is set in another terminal apparatus that is not capable of changing the setting of the configuration pattern, (iii) a response signal transmitted in a first subframe of the first configuration pattern is a response signal to uplink data transmitted in a second subframe, and (iv) a response signal transmitted in the first subframe of the second configuration pattern is a response signal to uplink data transmitted in a third subframe different from the second subframe, are satisfied:
the circuitry assigns the response signal such that, in the first subframe, a first resource assigned to the response signal in response to the uplink data transmitted from the terminal apparatus in the second subframe is different from a second resource assigned to the response signal in response to the uplink data transmitted from the another terminal apparatus in the third subframe; and
when the response signal intended for the terminal apparatus transmitted in the first subframe is a response signal in response to the uplink data transmitted in the second subframe and the uplink data transmitted in the third subframe, the first resource is a resource associated with a physical resource block having an index obtained by adding one to an index of a physical resource block associated with a third resource assigned to the response signal in response to the uplink data transmitted from the terminal apparatus in the third subframe.

3. A reception method for terminal apparatus capable of changing setting of a configuration pattern of subframes making up a single frame to one of a plurality of configuration patterns including a subframe in which uplink data is transmitted and a subframe in which a response signal in response to the uplink data is transmitted, the method comprising:
receiving a signal transmitted from a base station apparatus; and
demultiplexing, based on an association between the subframe in which the uplink data is transmitted and a resource to which the response signal is assigned, the response signal that is assigned to the resource from the signal, wherein, when all the following conditions: (i) a first configuration pattern is set in the terminal apparatus, (ii) a second configuration pattern is set in another terminal apparatus that is not capable of changing the setting of the configuration pattern, (iii) a response signal transmitted in a first subframe of the first configuration pattern is a response signal to uplink data transmitted in a second subframe, and (iv) a response signal transmitted in the first subframe of the second configuration pattern is a response signal to uplink data transmitted in a third subframe different from the second subframe, are satisfied:

the response signal is demultiplexed, wherein in the first subframe, a first resource assigned to the response signal in response to the uplink data transmitted from the terminal apparatus in the second subframe is different from a second resource assigned to the response signal in response to the uplink data transmitted from the another terminal apparatus in the third subframe; and when the response signal intended for the terminal apparatus transmitted in the first subframe is a response signal in response to the uplink data transmitted in the second subframe and the uplink data transmitted in the third subframe, the first resource is a resource associated with a physical resource block having an index obtained by adding one to an index of a physical resource block associated with a third resource assigned to the response signal in response to the uplink data transmitted from the terminal apparatus in the third subframe.

4. A transmission method comprising:

generating a response signal in response to uplink data transmitted from a terminal apparatus capable of changing setting of a configuration pattern of subframes making up a single frame to one of a plurality of configuration patterns including a subframe in which uplink data is transmitted and a subframe in which a response signal in response to the uplink data is transmitted;

assigning, based on an association between a subframe in which the uplink data is transmitted and a resource to which the response signal is assigned, the response signal to the resource to which the response signal is assigned; and transmitting a signal including the response signal, wherein, when all the following conditions: (i) a first configuration pattern is set in the terminal apparatus, (ii) a second configuration pattern is set in another terminal apparatus that is not capable of changing the setting of the configuration pattern, (iii) a response signal transmitted in a first subframe of the first configuration pattern is a response signal to uplink data transmitted in a second subframe, and (iv) a response signal transmitted in the first subframe of the second configuration pattern is a response signal to uplink data transmitted in a third subframe different from the second subframe, are satisfied:

the response signal is assigned such that, in the first subframe, a first resource assigned to the response signal in response to the uplink data transmitted from the terminal apparatus in the second subframe is different from a second resource assigned to the response signal in response to the uplink data transmitted from the ether another terminal apparatus in the third subframe; and when the response signal intended for the terminal apparatus transmitted in the first subframe is a response signal in response to the uplink data transmitted in the second subframe and the uplink data transmitted in the third subframe, the first resource is a resource associated with a physical resource block having an index obtained by adding one to an index of a physical resource block associated with a third resource assigned to the response signal in response to the uplink data transmitted from the terminal apparatus in the third subframe.

* * * * *